US012791955B2

(12) United States Patent
Aoki et al.

(10) Patent No.: US 12,791,955 B2
(45) Date of Patent: Nov. 10, 2026

(54) TONER

(71) Applicant: CANON KABUSHIKI KAISHA, Tokyo (JP)

(72) Inventors: Kenji Aoki, Shizuoka (JP); Mariko Yamashita, Shizuoka (JP); Yuhei Terui, Shizuoka (JP); Takashi Matsui, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 560 days.

(21) Appl. No.: 18/339,903

(22) Filed: Jun. 22, 2023

(65) Prior Publication Data

US 2023/0418177 A1 Dec. 28, 2023

(30) Foreign Application Priority Data

Jun. 22, 2022 (JP) ................................ 2022-100372

(51) Int. Cl.
*G03G 9/087* (2006.01)

(52) U.S. Cl.
CPC ..... *G03G 9/08733* (2013.01); *G03G 9/08728* (2013.01)

(58) Field of Classification Search
CPC ....................... G03G 9/08733; G03G 9/08728
See application file for complete search history.

(56) References Cited

U.S. PATENT DOCUMENTS

2005/0214670 A1 9/2005 Matsumoto
2009/0035682 A1 2/2009 Shima
2014/0308611 A1 10/2014 Shimano et al.
(Continued)

FOREIGN PATENT DOCUMENTS

JP H09034163 A 2/1997
JP 2004191927 A 7/2004
(Continued)

*Primary Examiner* — Amber R Orlando
*Assistant Examiner* — Charles Collins Sullivan, IV
(74) *Attorney, Agent, or Firm* — Canon U.S.A., Inc. IP Division

(57) ABSTRACT

A toner comprising a toner particle, the toner particle comprising a binder resin, wherein T1, T2, T3, tan δ(T2), and tan δ(T2−10) satisfy expressions (1) to (4):

$$T3 - T1 \leq 10 \quad (1)$$

$$50 \leq T2 \leq 70 \quad (2)$$

$$0.30 \leq \tan\delta(T2) \leq 1.00 \quad (3)$$

$$1.00 \leq \tan\delta(T2)/\tan\delta(T2-10) \leq 1.90. \quad (4)$$

Where, in measurement of viscoelasticity of the toner, T1(° C.) represents a temperature at which a storage elastic modulus G' is $3.0\times10^7$ Pa, T2(° C.) represents a temperature at which the storage elastic modulus G' is $1.0\times10^7$ Pa, T3(° C.) represents a temperature at which the storage elastic modulus G' is $3.0\times10^6$ Pa, tan δ(T2) represents a ratio (tan δ) of a loss elastic modulus G" to the storage elastic modulus G' at the temperature T2(° C.), and tan δ(T2−10) represents the ratio (tan δ) at a temperature: T2−10(° C.).

3 Claims, 1 Drawing Sheet

(56) References Cited

U.S. PATENT DOCUMENTS

| | | | | |
|---|---|---|---|---|
| 2017/0045834 | A1 | 2/2017 | Shirai | |
| 2019/0384195 | A1 | 12/2019 | Saeki | |
| 2020/0225598 | A1 | 7/2020 | Sriskandha | |
| 2021/0181647 | A1 * | 6/2021 | Hashimoto | C08G 63/183 |
| 2022/0107573 | A1 * | 4/2022 | Akiyama | G03G 9/08711 |

FOREIGN PATENT DOCUMENTS

| | | | |
|---|---|---|---|
| JP | 2014130243 | A | 7/2014 |
| JP | 2014142632 | A | 8/2014 |
| JP | 2016-066018 | A | 4/2016 |
| JP | 2016110150 | A | 6/2016 |
| JP | 2016-218237 | A | 12/2016 |
| JP | 2018-151619 | A | 9/2018 |
| JP | 2019-219645 | A | 12/2019 |
| JP | 2020173414 | A | 10/2020 |
| JP | WO2019225207 | A1 | 2/2021 |
| JP | 2021-036316 | A | 3/2021 |
| JP | 2021-096463 | A | 6/2021 |
| JP | 2021092707 | A | 6/2021 |
| JP | 2021096278 | A | 6/2021 |
| WO | 2013047296 | A1 | 4/2013 |

* cited by examiner

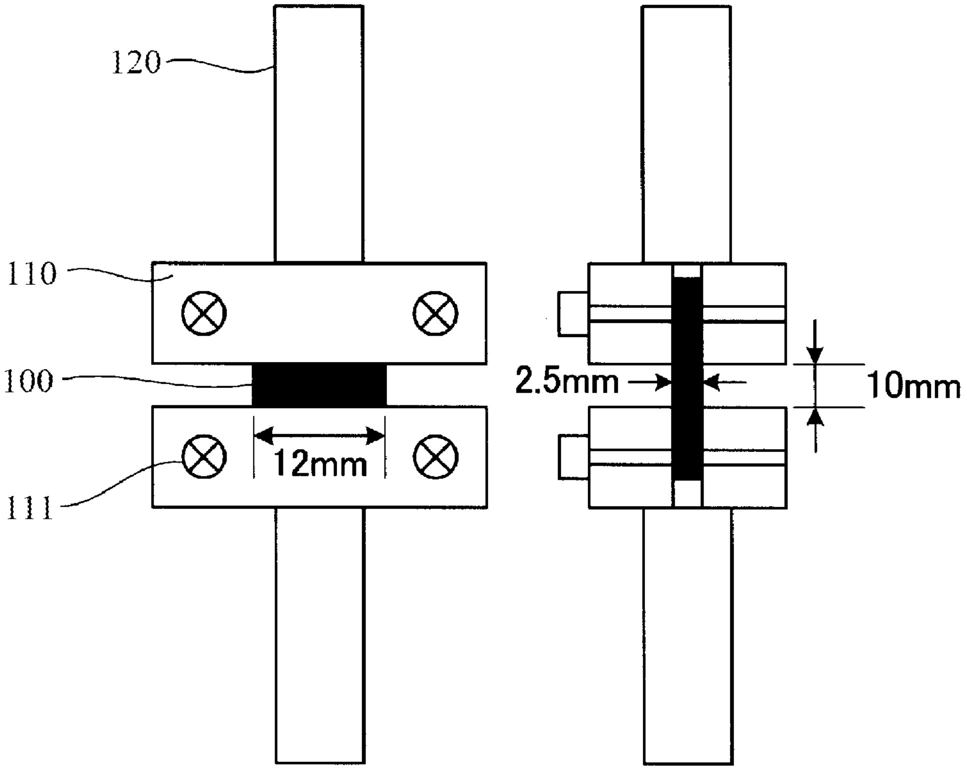
120
110
100
111
12mm
2.5mm
10mm

TONER

BACKGROUND OF THE INVENTION

Field of the Invention

The present disclosure relates to a toner that is used in electrophotography and electrostatic recording methods.

Description of the Related Art

Energy saving in electrophotography apparatuses is considered to be a big technical issue, and a significant reduction in the amount of heat applied to fixing apparatuses has been considered. In particular, there are growing needs for so-called "low-temperature fixability" of toners, which enables fixation of the toners with lower energy.

As a technique for enabling fixation of a toner at low temperatures, for example, WO 2013/047296 discloses a toner to which a plasticizer is added. The plasticizer has a function of increasing the softening rate of a binder resin while maintaining the glass transition temperature (Tg) of the toner, and can improve the low-temperature fixability. However, the toner softens through a step of plasticizing the binder resin after the plasticizer is melted, and accordingly, there is a limit in the melting rate of the toner, and a further improvement in the low-temperature fixability is desired.

Under the above circumstances, consideration has been given to a method of using a crystalline resin as the binder resin. Amorphous resins that are commonly used as binder resins for a toner do not have clear endothermic peaks in differential scanning calorimetry (DSC), but in the case where a crystalline resin component is contained, an endothermic peak (melting point) appears in differential scanning calorimetry.

Crystalline resins have a characteristic of hardly softening at temperatures lower than the melting point due to regular arrangement of molecular chains. Also, crystals of crystalline resins rapidly melt when the temperature exceeds the melting point, and the viscosity rapidly decreases as the crystals melt. Therefore, crystalline resins have excellent sharp melt properties and are attracting attention as materials that have the low-temperature fixability. Japanese Patent Application Publication No. 2004-191927 proposes a toner in which a large amount of crystalline polyester is used as a crystalline resin.

Also, a toner is described in which a crystalline vinyl resin that has a long-chain alkyl group as a side chain in its molecule is used as a crystalline resin. Commonly, a crystalline vinyl resin has a long-chain alkyl group as a side chain of the main chain backbone, and is crystallized through crystallization of long-chain alkyl groups, which are side chains. Japanese Patent Application Publication No. 2020-173414 proposes a toner obtained using a crystalline vinyl resin that is obtained by copolymerizing a polymerizable monomer having a long-chain alkyl group and a polymerizable monomer having a different SP value. Also, Japanese Patent Application Publication No. 2014-142632 proposes a toner in which a sea-island structure is formed by a crystalline vinyl resin and an amorphous resin.

However, it was found that when the toners described in Japanese Patent Application Publication No. 2004-191927, Japanese Patent Application Publication No. 2020-173414, and Japanese Patent Application Publication No. 2014-142632 are fixed to rough paper at low temperatures, it is difficult to achieve high gloss and gloss uniformity while satisfying the low-temperature fixability and heat-resistant storability. In the case where unevenness of rough paper is large, protruded portions of the rough paper are easily heated, and accordingly, a toner easily deforms on the protruded portions, but depressed portions of the rough paper are difficult to heat, and accordingly, the toner is unlikely to deform in the depressed portions.

The toners described in Japanese Patent Application Publication No. 2004-191927, Japanese Patent Application Publication No. 2020-173414, and Japanese Patent Application Publication No. 2014-142632 undergo a rapid change from elastic properties to viscous properties around temperatures at which the toners start to melt, and therefore, when the toners are fixed at low temperatures, deformation of the toners is further facilitated on protruded portions and further suppressed in depressed portions. It is thought, as a consequence, high gloss and gloss uniformity cannot be achieved. Under the above circumstances, further improvement is desired to realize a toner that has excellent low-temperature fixability and heat-resistant storability and shows high gloss and excellent gloss uniformity when fixed to rough paper at low temperatures.

SUMMARY OF THE INVENTION

The present disclosure proposes a toner that has excellent low-temperature fixability and heat-resistant storability and shows high gloss and excellent gloss uniformity when fixed to rough paper at low temperatures.

The present disclosure relates to a toner comprising a toner particle, the toner particle comprising a binder resin, wherein T1, T2, T3, tan δ(T2), and tan δ(T2−10) satisfy expressions (1) to (4):

$$T3-T1\leq 10 \quad (1)$$

$$50\leq T2\leq 70 \quad (2)$$

$$0.30\leq \tan\delta(T2)\leq 1.00 \quad (3)$$

$$1.00\leq \tan\delta(T2)/\tan\delta(T2-10)\leq 1.90. \quad (4)$$

Where, in measurement of viscoelasticity of the toner, T1(° C.) represents a temperature at which a storage elastic modulus G' is $3.0\times10^7$ Pa, T2(° C.) represents a temperature at which the storage elastic modulus G' is $1.0\times10^7$ Pa, T3(° C.) represents a temperature at which the storage elastic modulus G' is $3.0\times10^6$ Pa, tan δ(T2) represents a ratio (tan δ) of a loss elastic modulus G" to the storage elastic modulus G' at the temperature T2(° C.), and tan δ(T2−10) represents the ratio (tan δ) at a temperature: T2−10(° C.).

The present disclosure can propose a toner that has excellent low-temperature fixability and heat-resistant storability and shows high gloss and excellent gloss uniformity when fixed to rough paper at low temperatures. Further features of the present disclosure will become apparent from the following description of exemplary embodiments with reference to the attached drawings.

BRIEF DESCRIPTION OF THE DRAWINGS

The FIGURE shows an example of a manner in which a sample is attached in viscoelasticity measurement.

DESCRIPTION OF THE EMBODIMENTS

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably. The term "(meth)acrylic acid ester" means an acrylic acid ester and/or a methacrylic acid ester.

The term "monomer unit" refers to a reacted form of a monomer material included in a polymer. For example, a section including a carbon-carbon bond in a main chain of a polymer formed through polymerization of a vinyl monomer will be referred to as a single unit. A vinyl monomer can be represented by the following formula (C).

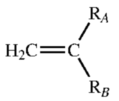

(C)

In the formula (C), $R_A$ represents a hydrogen atom or an alkyl group (preferably, an alkyl group having 1 to 3 carbon atoms, and more preferably a methyl group), and $R_B$ represents any substituent. The term "crystalline resin" refers to a resin that has a clear endothermic peak in differential scanning calorimetry (DSC).

The inventors of the present invention found that it is possible to solve the problems described above by appropriately controlling the loss elastic modulus, the storage elastic modulus, and tan δ determined through measurement of viscoelasticity of a toner. The present disclosure relates to a toner comprising a toner particle comprising a binder resin, wherein T1, T2, T3, tan δ(T2), and tan δ(T2−10) satisfy following expressions (1) to (4)

$$T3 - T1 \leq 10 \quad (1)$$

$$50 \leq T2 \leq 70 \quad (2)$$

$$0.30 \leq \tan\delta(T2) \leq 1.00 \quad (3)$$

$$1.00 \leq \tan\delta(T2)/\tan\delta(T2-10) \leq 1.90 \quad (4)$$

where, in measurement of viscoelasticity of the toner, T1[° C.] represents a temperature at which a storage elastic modulus G' is $3.0\times10^7$ Pa, T2[° C.] represents a temperature at which the storage elastic modulus G' is $1.0\times10^7$ Pa, T3[° C.] represents a temperature at which the storage elastic modulus G' is $3.0\times10^6$ Pa, tan δ(T2) represents a ratio (tan δ) of a loss elastic modulus G" to the storage elastic modulus G' at the temperature T2[° C.], and tan δ(T2−10) represents the ratio (tan δ) at a temperature: T2−10[° C.]

In order to realize both the low-temperature fixability and the heat-resistant storability, the storage elastic modulus needs to be high until the temperature of the toner reaches a temperature that is determined as a requirement for the heat-resistant storability and the storage elastic modulus needs to rapidly decrease when the temperature of the toner becomes higher than that temperature, or in other words, the toner needs to have sharp melt properties (the expressions (1) and (2)).

Commonly, the ratio (tan δ) of the loss elastic modulus G" to the storage elastic modulus G' indicates a degree of deformability, namely, whether the polymer material shows strong elastic properties or strong viscous properties. The smaller tan δ is, the harder it is to deform the polymer material, and the closer the polymer material becomes to a "rubber-like" state. The larger tan δ is, the easier it is to deform the polymer material, and the closer the polymer material becomes to a "smoothly flowing" state. It was found that, accordingly, by making a change in tan δ appropriate in a temperature range in which the toner sharply melts (the expressions (3) and (4)), it is possible to control the degree of deformability of the toner at the time of low-temperature fixing and achieve gloss uniformity.

The following describes the toner in detail. In measurement of viscoelasticity of the toner, a temperature at which the storage elastic modulus G' is $3.0\times10^7$ Pa will be denoted by T1[° C.], a temperature at which the storage elastic modulus G' is $1.0\times10^7$ Pa will be denoted by T2[° C.], and a temperature at which the storage elastic modulus G' is $3.0\times10^6$ Pa will be denoted by T3[° C.]. At this time, T1, T2, and T3 satisfy the following expressions (1) and (2).

$$T3 - T1 \leq 10 \quad (1)$$

$$50 \leq T2 \leq 70 \quad (2)$$

T1 represents a temperature at which the elastic modulus corresponds to a state before the toner starts to sharply melt. T2 represents a temperature at which the elastic modulus corresponds to a state in which the toner is sharply melting. T3 represents a temperature at which the elastic modulus corresponds to a state in which the toner has sufficiently undergone sharp melting.

When the expressions (1) and (2) are satisfied, both the low-temperature fixability and the heat-resistant storability of the toner can be realized. If the difference: T3−T1 is larger than 10° C., the low-temperature fixability deteriorates and cold offset occurs. The difference: T3−T1 is preferably 8° C. or less, and more preferably 7° C. or less. The smaller the difference T3−T1 is, the better, and therefore, the lower limit is not particularly limited, but is preferably 0° C. or more, 1° C. or more, 3° C. or more, or 5° C. or more. For example, the difference is preferably 0° C. to 8° C., 1° C. to 8° C., 3° C. to 8° C., to 8° C., 3° C. to 7° C., or 5° C. to 7° C.

It is possible to control the difference: T3−T1 by adjusting the proportion of a crystalline resin contained in the toner or the proportion of a segment that shows crystallinity in the crystalline resin, for example. $T_1$ is preferably 45° C. to 65° C., and more preferably 50° C. to 60° C. T3 is preferably 50° C. to 70° C., and more preferably to 65° C.

T2 lower than 50° C. is advantageous in terms of the low-temperature fixability, but in this case, the heat-resistant storability of the toner significantly deteriorates. On the other hand, if T2 is higher than 70° C., the toner has excellent heat-resistant storability, but the low-temperature fixability deteriorates and cold offset occurs. T2 is preferably 55° C. to 65° C., and more preferably 57° C. to 63° C.

In the case where the toner contains a vinyl resin that has a long-chain alkyl group as the crystalline resin, it is possible to control T2 by adjusting the length of the long-chain alkyl group or the proportion of the long-chain alkyl group in the crystalline resin, for example. In the case where the toner contains a polyester resin as the crystalline resin, it is possible to control T2 by adjusting the number of carbon atoms in a diol component and a dicarboxylic acid component that are used.

Moreover, in the measurement of viscoelasticity of the toner, the ratio (tan δ) of the loss elastic modulus G" to the storage elastic modulus G' at the temperature T2[° C.] will be denoted by tan δ(T2), and tan δ at a temperature: T2−10[° C.] will be denoted by tan δ(T2−10). At this time, tan δ(T2) and tan δ(T2−10) satisfy the following expressions (3) and (4).

$$0.30 \leq \tan\delta(T2) \leq 1.00 \quad (3)$$

$$1.00 \leq \tan\delta(T2)/\tan\delta(T2-10) \leq 1.90 \quad (4)$$

T2 is a temperature corresponding to the state in which the toner is sharply melting, and accordingly, when tan δ(T2) is within the range of the expression (3), appropriate deformability at the time of low-temperature fixing is maintained, and it is possible to achieve high gloss of the toner fixed to rough paper. Also, when tan δ(T2)/tan δ(T2−10) is within the range of the expression (4), deformability of the toner on protruded portions and depressed portions of rough paper falls within the constant range and the toner can deform moderately, and accordingly, gloss uniformity is improved.

If tan δ(T2) is smaller than 0.30, elastic properties become too strong at the time of low-temperature fixing, and gloss of the toner fixed to rough paper deteriorates. If tan δ(T2) is larger than 1.00, viscous properties become too strong at the time of low-temperature fixing and permeation of the toner into paper is facilitated, and accordingly, gloss uniformity deteriorates.

The lower limit of tan δ(T2) is preferably 0.40 or more, and more preferably or more. The upper limit of tan δ(T2) is preferably 0.90 or less, more preferably or less, and further preferably 0.70 or less. For example, tan δ(T2) is preferably to 0.90, 0.50 to 0.80, or 0.50 to 0.70.

It is possible to control tan δ(T2) by adjusting an addition amount of the crystalline resin contained in the toner, for example. In particular, in the case where the crystalline resin is a vinyl resin that has a long-chain alkyl group, it is possible to control tan δ(T2) by adjusting the length of the long-chain alkyl group or the proportion of the long-chain alkyl group in a binder resin, for example. It is also possible to control tan δ(T2) by adjusting the type or addition amount of a crosslinking agent when manufacturing the toner. Specifically, it is possible to increase tan δ(T2) by increasing the proportion of the long-chain alkyl group in the binder resin, for example. Also, it is possible to reduce tan δ(T2) by reducing the proportion of the long-chain alkyl group in the binder resin or adding a crosslinking agent, for example.

If tan δ(T2)/tan δ(T2−10) is smaller than 1.00, deformation of the toner is suppressed even when the toner has sharply melted, and therefore, abrasion resistance of a fixed image deteriorates. If tan δ(T2)/tan δ(T2−10) is larger than 1.90, the toner undergoes a rapid change from elastic properties to viscous properties around a temperature at which the toner starts to melt. Therefore, at the time of low-temperature fixing, deformation of the toner is further facilitated on protruded portions and further suppressed in depressed portions. As a consequence, gloss uniformity deteriorates.

The lower limit of tan δ(T2)/tan δ(T2−10) is preferably 1.10 or more, more preferably 1.20 or more, further preferably 1.30 or more, yet more preferably 1.40 or more, still more preferably 1.50 or more, and particularly preferably 1.60 or more. The upper limit of tan δ(T2)/tan δ(T2−10) is preferably 1.80 or less, more preferably 1.75 or less, and further preferably 1.70 or less. For example, tan δ(T2)/tan δ(T2−10) is preferably 1.10 to 1.80, 1.20 to 1.75, 1.30 to 1.75, 1.40 to 1.75, 1.50 to 1.75, 1.60 to 1.75, or 1.60 to 1.70.

For example, tan δ(T2) and tan δ(T2−10) preferably satisfy the following expression (5).

$$1.20 \leq \tan\delta(T2)/\tan\delta(T2-10) \leq 1.90 \quad (5)$$

It is possible to control tan δ(T2)/tan δ(T2−10) by adjusting the type or addition amount of an amorphous resin used in the toner, for example. Specifically, it is possible to increase tan δ(T2)/tan δ(T2−10) by introducing a component that has high affinity to the crystalline resin into the amorphous resin or increasing the proportion of the long-chain alkyl group in the binder resin. Also, it is possible to reduce tan δ(T2)/tan δ(T2−10) by introducing a component that has low affinity to the crystalline resin into the amorphous resin or reducing the proportion of the long-chain alkyl group in the binder resin.

The toner includes a toner particle that contains the binder resin. The binder resin preferably includes a crystalline resin A. Examples of the crystalline resin A include a crystalline vinyl resin, a crystalline polyester resin, a crystalline polyurethane resin, and a crystalline epoxy resin, and a crystalline vinyl resin is preferably used. In the case where the crystalline resin A is a crystalline vinyl resin, the crystalline resin A preferably includes a monomer unit (a) represented by the following formula (6).

In the formula (6), $R^4$ represents a hydrogen atom or a methyl group, and n represents an integer from 15 to 35.

(6)

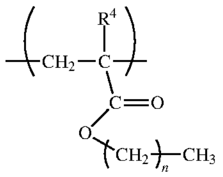

The formula (6) indicates that the crystalline resin A has a long-chain alkyl group, and the resin tends to show crystallinity due to having the long-chain alkyl group. When n in the formula (6) is 15 to 35, it is easy to control the temperature T2 so as to fall within the range of the expression (2) described above. n is preferably 17 to 29, and more preferably 19 to 23.

As a method for introducing the monomer unit (a), it is possible to use a method of polymerizing any of the following (meth)acrylic acid esters. Examples of the (meth) acrylic acid esters include (meth)acrylic acid esters that have a linear alkyl group having 16 to 36 carbon atoms [stearyl (meth)acrylate, nonadecyl (meth)acrylate, eicosyl (meth) acrylate, heneicosanyl (meth)acrylate, behenyl (meth)acrylate, lignoceryl (meth)acrylate, ceryl (meth)acrylate, octacosyl (meth)acrylate, myricyl (meth)acrylate, dotriacontyl (meth)acrylate, etc.] and (meth)acrylic acid esters that have a branched alkyl group having 18 to 36 carbon atoms [e.g., 2-decyltetradecyl (meth)acrylate]. One type of monomer may be used alone or two or more types of monomers may be used in combination to form the monomer unit (a).

In the case where the crystalline resin A is a crystalline vinyl resin, the crystalline resin A can include another monomer unit in addition to the monomer unit (a). As a method for introducing the other monomer unit, it is possible to use a method of polymerizing any of the (meth)acrylic acid esters listed above and another vinyl monomer.

Examples of the other vinyl monomer include the followings.

(Meth)acrylic acid esters such as styrene, α-methylstyrene, methyl (meth)acrylate, ethyl (meth)acrylate, n-butyl (meth)acrylate, t-butyl (meth)acrylate, and 2-ethylhexyl (meth)acrylate.

Monomers that have a urea group, such as monomers obtained by causing a reaction between an amine having 3 to 22 carbon atoms [e.g., a primary amine (normal-butylamine, t-butylamine, propylamine, isopropylamine, etc.), a secondary amine (di-normal-ethylamine, di-normal-propylamine, di-normal-butylamine, etc.), aniline, cycloxyl amine, etc.] and an isocyanate that has an ethylenically unsaturated bond and 2 to 30 carbon atoms, by using a known method.

Monomers that have a carboxy group, such as methacrylic acid, acrylic acid, and 2-carboxyethyl (meth)acrylate.

Monomers that have a hydroxy group, such as 2-hydroxyethyl (meth)acrylate and 2-hydroxypropyl (meth)acrylate.

Monomers that have an amide group, such as acrylamides and monomers obtained by causing a reaction between an amine having 1 to 30 carbon atoms and a carboxylic acid (acrylic acid, methacrylic acid, etc.) that has an ethylenically unsaturated bond and 2 to 30 caron atoms, by using a known method. Monomers that have a nitrile group, such as acrylonitrile and methacrylonitrile.

In particular, styrene, methacrylic acid, acrylic acid, methyl (meth)acrylate, t-butyl (meth)acrylate, acrylonitrile, and methacrylonitrile are preferably used.

The percentage of the content of the monomer unit (a) represented by the formula (6) in the crystalline resin A is preferably 50.0 to 100.0 mass %. The lower limit is more preferably 60.0 mass % or more, further preferably 65.0 mass % or more, and yet more preferably 70.0 mass % or more. The upper limit is more preferably 95.0 mass % or less, further preferably 90.0 mass % or less, and yet more preferably 85.0 mass % or less. For example, the percentage of the content of the monomer unit (a) is preferably 60.0 to 95.0 mass %, 65.0 to 90.0 mass %, or 70.0 to 85.0 mass %.

When the percentage of the content of the monomer unit (a) falls within the above range, it becomes easier to satisfy the expressions (1) to (4) shown above. If the crystalline resin A includes two or more types of monomer units (a), the "percentage of the content of the monomer unit (a)" refers to the percentage of a total content of the two or more types of monomer units (a).

The crystalline resin A preferably includes a monomer unit formed by styrene and represented by the following formula (A). Also, the crystalline resin A preferably includes a monomer unit formed by (meth)acrylic acid and represented by the following formula (B). Also, the crystalline resin A preferably includes a monomer unit formed by (meth)acrylonitrile and represented by the following formula (C).

(A)

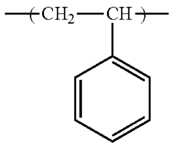

-continued (B)

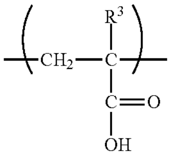

(C)

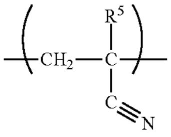

In the formula (B), $R^3$ represents a hydrogen atom or a methyl group. $R^3$ is preferably a methyl group. In the formula (C), $R^5$ represents a hydrogen atom or a methyl group. $R^5$ is preferably a methyl group.

The percentage of the content of the monomer unit formed by styrene in the crystalline resin A is preferably 1.0 to 50.0 mass %, more preferably 5.0 to 30.0 mass %, and further preferably 10.0 to 27.0 mass %. The percentage of the content of the monomer unit formed by (meth)acrylic acid (preferably methacrylic acid) in the crystalline resin A is preferably 1.0 to 5.0 mass %, more preferably 1.0 to 3.0 mass %, and further preferably 1.0 to 2.5 mass %. The percentage of the content of the monomer unit formed by (meth)acrylonitrile (preferably methacrylonitrile) in the crystalline resin A is preferably 1.0 to 30.0 mass %, more preferably 1.0 to 20.0 mass %, and further preferably 5.0 to 15.0 mass %.

In the case where the crystalline resin A is a polyester resin, it is possible to use a resin that shows crystallinity from among polyester resins that can be obtained through a reaction between a carboxylic acid having two or more carboxy groups and a polyhydric alcohol.

Examples of the carboxylic acid having two or more carboxy groups include the following compounds. Dibasic acids such as succinic acid, adipic acid, sebacic acid, phthalic acid, isophthalic acid, terephthalic acid, malonic acid, and dodecenyl succinic acid, anhydrides and lower alkyl esters of these, and aliphatic unsaturated dicarboxylic acids such as maleic acid, fumaric acid, itaconic acid, and citraconic acid.

Examples of the carboxylic acid having two or more carboxy groups also include 1,2,4-benzenetricarboxylic acid, 1,2,5-benzenetricarboxylic acid, and anhydrides and lower alkyl esters of these. These may be used alone or in combination of two or more.

Examples of the polyhydric alcohol include the following compounds. Alkylene glycols (ethylene glycol, 1,2-propylene glycol, and 1,3-propylene glycol); alkylene ether glycols (polyethylene glycol and polypropylene glycol); alicyclic diols (1,4-cyclohexanedimethanol); bisphenols (bisphenol A); and alkylene oxide (ethylene oxide and propylene oxide) adducts of alicyclic diols. Alkyl moieties in alkylene glycols and alkylene ether glycols may be linear or branched.

Examples of the polyhydric alcohol further include glycerol, trimethylolethane, trimethylolpropane, and pentaerythritol. These may be used alone or in combination of two or more.

It is also possible to use a monovalent acid such as acetic acid or benzoic acid or a monohydric alcohol such as cyclohexanol or benzyl alcohol to adjust the acid value or the hydroxyl value. Although there is no particular limitation on the method for manufacturing the polyester resin, the polyester resin can be manufactured using either a transesterification method or a direct polycondensation method or a combination of these methods.

The percentage of the content of the crystalline resin A in the toner is preferably 10.0 to 70.0 mass %. If the percentage of the crystalline resin A in the toner falls within this range, the percentage is more appropriate, and it becomes easier to satisfy the expressions (1) to (4). The lower limit is more preferably 15.0 mass % or more, further preferably 20.0 mass % or more, yet more preferably 25.0 mass % or more, and particularly preferably 30.0 mass % or more. The upper limit is more preferably 60.0 mass % or less, further preferably 50.0 mass % or less, and yet more preferably 40.0 mass % or less. For example, the percentage of the content of the crystalline resin A is preferably 15.0 to 60.0 mass %, 20.0 to 50.0 mass %, 25.0 to 40.0 mass %, or 30.0 to 40.0 mass %.

The binder resin preferably includes an amorphous resin B in addition to the crystalline resin A. Examples of the amorphous resin B include a vinyl resin, a polyester resin, a polyurethane resin, and an epoxy resin, and a vinyl resin and a polyester resin are preferably used. The amorphous resin B is more preferably a vinyl resin. The amorphous resin B preferably includes a monomer unit (b) represented by the following formula (7).

In the formula (7), $R^2$ represents a hydrogen atom or a methyl group, and m represents an integer from 7 to 35.

(7)

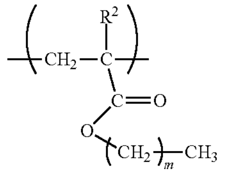

If the amorphous resin B includes the monomer unit (b), it is easy to improve compatibility with the crystalline resin A. Accordingly, an interface between the crystalline resin A and the amorphous resin B in the toner tends to be indistinct, and durability of the toner tends to be further improved. Also, if the amorphous resin B includes the monomer unit (b), it is easy to improve compatibility with the crystalline resin A, and accordingly, it is easy to increase tan δ(T2)/tan δ(T2−10) to 1.00 or more. m is preferably 7 to 29, more preferably 7 to 19, further preferably 7 to 15, yet more preferably 7 to 14, still more preferably 9 to 14, and particularly preferably 9 to 13.

The monomer unit (b) can be introduced by using a (meth)acrylic acid ester that has a linear alkyl group having 8 to 36 carbon atoms, as a monomer. Examples of the (meth)acrylic acid ester include, in addition to the above-listed (meth)acrylic acid esters that may be used to introduce the monomer unit (a), octyl (meth)acrylate, decyl (meth) acrylate, lauryl (meth)acrylate, myristyl (meth)acrylate, and palmityl (meth)acrylate. One type of monomer may be used alone or two or more types of monomers may be used in combination to form the monomer unit (b).

In the case where the amorphous resin B is a vinyl resin, the amorphous resin B can include another monomer unit in addition to the monomer unit (b). As a method for introducing the other monomer unit, it is possible to use a method of polymerizing any of the (meth)acrylic acid esters listed above and the vinyl monomers that may be used for the crystalline resin A described above. The amorphous resin B may also include a monomer unit derived from a known crosslinking agent that has a plurality of vinyl groups, acryloyl groups, or methacryloyl groups, such as hexanediol diacrylate.

The amorphous resin B preferably includes at least one monomer unit Y selected from the group consisting of a monomer unit formed by styrene and represented by the following formula (D) and a monomer unit formed by a (meth)acrylic acid alkyl ester and represented by the following formula (E).

(D)

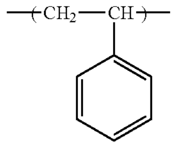

(E)

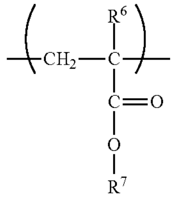

In the formula (E), $R^6$ represents a hydrogen atom or a methyl group, and $R^7$ represents an alkyl group having 1 to 8 (preferably 1 to 6, and more preferably 1 to 4) carbon atoms.

The percentage of the content of the monomer unit (b) in the amorphous resin B is preferably 5.0 to 40.0 mass %. The lower limit is more preferably 10.0 mass % or more, further preferably 15.0 mass % or more, and yet more preferably 20.0 mass % or more. The upper limit is more preferably 35.0 mass % or less, and further preferably 30.0 mass % or less. For example, the percentage of the content of the monomer unit (b) is preferably 10.0 to 35.0 mass %, 15.0 to 30.0 mass %, or 20.0 to 30.0 mass %. If the percentage of the content of the monomer unit (b) falls within the above range, it becomes easier to control tan δ(T2)/tan δ(T2−10) so as to fall within the specific range described above.

The percentage of the content of the at least one monomer unit Y selected from the group consisting of a monomer unit formed by styrene and represented by the formula (D) and a monomer unit formed by a (meth)acrylic acid alkyl ester and represented by the formula (E) in the amorphous resin B is preferably 60.0 to 95.0 mass %, more preferably 65.0 to 90.0 mass %, further preferably 70.0 to 85.0 mass %, and yet more preferably 70.0 to 80.0 mass %.

In the case where the amorphous resin B is a polyester resin, it is possible to use a resin that does not show crystallinity from among the above-described polyester resins that can be obtained through a reaction between a carboxylic acid having two or more carboxy groups and a polyhydric alcohol.

The percentage of the content of the amorphous resin B in the binder resin is preferably 20.0 to 90.0 mass %, more preferably 30.0 to 80.0 mass %, and further preferably 40.0 to 70.0 mass %.

The weight-average molecular weight (Mw) of tetrahydrofuran (THF)-soluble matter in the toner measured using gel permeation chromatography (GPC) is preferably 10000 to 200000. The lower limit is more preferably 30000 or more, further preferably 50000 or more, and yet more preferably 90000 or more. The upper limit is more preferably 180000 or less, further preferably 150000 or less, and yet more preferably 110000 or less. For example, Mw is 30000 to 180000, 50000 to 150000, or 90000 to 110000. If Mw falls within the above range, durability of the toner tends to be further improved.

The toner may contain a release agent. The release agent is preferably at least one selected from the group consisting of a hydrocarbon wax and an ester wax. Use of a hydrocarbon wax and/or an ester wax makes it easy to achieve effective releasability.

The hydrocarbon wax is not particularly limited, but examples thereof are as follows. Aliphatic hydrocarbon waxes: low molecular weight polyethylene, low molecular weight polypropylene, low molecular weight olefin copolymers, Fischer Tropsch waxes, and waxes obtained by subjecting these to oxidation or acid addition.

The ester wax should have at least one ester bond per molecule, and may be a natural ester wax or a synthetic ester wax. Ester waxes are not particularly limited, but examples thereof are as follows: Esters of a monohydric alcohol and a monocarboxylic acid, such as behenyl behenate, stearyl stearate and palmityl palmitate; Esters of a dicarboxylic acid and a monoalcohol, such as dibehenyl sebacate; Esters of a dihydric alcohol and a monocarboxylic acid, such as ethylene glycol distearate and hexane diol dibehenate; Esters of a trihydric alcohol and a monocarboxylic acid, such as glycerol tribehenate; Esters of a tetrahydric alcohol and a monocarboxylic acid, such as pentaerythritol tetrastearate and pentaerythritol tetrapalmitate; Esters of a hexahydric alcohol and a monocarboxylic acid, such as dipentaerythritol hexastearate, dipentaerythritol hexapalmitate and dipentaerythritol hexabehenate; Esters of a polyfunctional alcohol and a monocarboxylic acid, such as polyglycerol behenate; and natural ester waxes such as carnauba wax and rice wax.

Of these, esters of a hexahydric alcohol and a monocarboxylic acid, such as dipentaerythritol hexastearate, dipentaerythritol hexapalmitate and dipentaerythritol hexabehenate, are preferred.

The release agent may be a hydrocarbon-based wax or an ester wax in isolation, a combination of a hydrocarbon-based wax and an ester wax, or a mixture of two or more types of each, but it is preferable to use a hydrocarbon-based wax in isolation or two or more types thereof. It is more preferable for the release agent to be a hydrocarbon wax.

In the toner, the release agent has a content of preferably from 1.0 mass % to mass %, or more preferably from 2.0 mass % to 25.0 mass % in the toner particle. If the content of the release agent in the toner particle is within this range, the release properties are easier to secure during fixing. The melting point of the release agent is preferably from 60° C. to 120° C. If the melting point of the release agent is within this range, it is more easily melted and exuded on the toner particle surface during fixing, and is more likely to provide release effects. The melting point is more preferably from 70° C. to 100° C.

The toner may also contain a colorant. Examples of colorants include known organic pigments, organic dyes, inorganic pigments, and carbon black and magnetic particles as black colorants. Other colorants conventionally used in toners may also be used. Examples of yellow colorants include condensed azo compounds, isoindolinone compounds, anthraquinone compounds, azo metal complexes, methine compounds and allylamide compounds. Specifically, C.I. pigment yellow 12, 13, 14, 15, 17, 62, 74, 83, 93, 94, 95, 109, 110, 111, 128, 129, 147, 155, 168 and 180 can be used by preference.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds. Specifically, C.I. pigment red 2, 3, 5, 6, 7, 23, 48:2, 48:3, 48:4, 57:1, 81:1, 122, 144, 146, 166, 169, 177, 184, 185, 202, 206, 220, 221 and 254 can be used by preference. Examples of cyan colorants include copper phthalocyanine compounds and their derivatives, anthraquinone compounds, and basic dye lake compounds. Specifically, C.I. pigment blue 1, 7, 15, 15:1, 15:2, 15:3, 15:4, 60, 62 and 66 can be used by preference.

The colorants are selected based on considerations of hue angle, chroma, lightness, weather resistance, OHP transparency, and dispersibility in the toner. The content of the colorant is preferably from 1.0 to 20.0 mass parts per 100.0 mass parts of the binder resin. When a magnetic particle is used as the colorant, the content thereof is preferably from 40.0 to 150.0 mass parts per 100.0 mass parts of the binder resin.

A charge control agent may be included in the toner particle as necessary. A charge control agent may also be added externally to the toner particle. By compound a charge control agent, it is possible to stabilize the charging properties and control the triboelectric charge quantity at a level appropriate to the developing system. A known charge control agent may be used, and a charge control agent capable of providing a rapid charging speed and stably maintaining a uniform charge quantity is especially desirable.

Organic metal compounds and chelate compounds are effective as charge control agents for giving the toner a negative charge, and examples include monoazo metal compounds, acetylacetone metal compounds, and metal compounds using aromatic oxycarboxylic acids, aromatic dicarboxylic acids, oxycarboxylic acids and dicarboxylic acids. Examples of charge control agents for giving the toner a positive charge include nigrosin, quaternary ammonium salts, metal salts of higher fatty acids, diorganotin borates, guanidine compounds and imidazole compounds. The content of the charge control agent is preferably from 0.01 to 20.0 mass parts, or more preferably from 0.5 to 10.0 mass parts per 100.0 mass parts of the toner particle.

The toner particle may be used as-is as a toner, but a toner may, if necessary, also be formed by mixing an external additive or the like so as to attach the external additive to the surface of the toner particle. Examples of the external additive include inorganic fine particles selected from the group consisting of silica fine particles, alumina fine particles and titania fine particles, and composite oxides of these. Examples of composite oxides include silica-aluminum fine particles and strontium titanate fine particles. The content of the external additive is preferably from 0.01 parts by mass to 8.0 parts by mass, and more preferably from 0.1 parts by mass to 4.0 parts by mass, relative to 100 parts by mass of the toner particle.

Within the scope of the present configuration, the toner particle may be manufactured by any known conventional method such as suspension polymerization, emulsion aggregation, dissolution suspension or pulverization, but is preferably manufactured by a suspension polymerization method.

The following describes the suspension polymerization method in detail. A polymerizable monomer composition is prepared by, for example, mixing the crystalline resin A synthesized in advance and polymerizable monomers for generating the amorphous resin B, and other materials such as a colorant, a release agent, and a charge control agent, as necessary, and uniformly dissolving or dispersing the materials.

Thereafter, the polymerizable monomer composition is dispersed in an aqueous medium using a stirrer or the like to prepare a suspended particle of the polymerizable monomer composition. Thereafter, the polymerizable monomers contained in the particle are polymerized using an initiator or the like to obtain a toner particle. After polymerization has finished, the toner particle is filtered, washed, and dried using known methods, and an external additive is added as necessary to obtain the toner.

A known polymerization initiator may be used. Examples of the polymerization initiator include: azo or diazo polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and peroxide polymerization initiators such as benzoyl peroxide, t-butyl peroxy-2-ethylhexanoate, t-butyl peroxypivalate, t-butyl peroxyisobutyrate, t-butyl peroxyneodecanoate, methylethylketone peroxide, diisopropyl peroxycarbonate, cumene hydroperoxide, 2,4-dichlorobenzoyl peroxide, and lauroyl peroxide. Also, a known chain transfer agent and a known polymerization inhibitor may be used.

The aqueous medium may contain an inorganic or organic dispersion stabilizer. A known dispersion stabilizer may be used. Examples of inorganic dispersion stabilizers include: phosphates such as hydroxyapatite, tribasic calcium phosphate, dibasic calcium phosphate, magnesium phosphate, aluminum phosphate, and zinc phosphate; carbonates such as calcium carbonate and magnesium carbonate; metal hydroxides such as calcium hydroxide, magnesium hydroxide, and aluminum hydroxide; sulfates such as calcium sulfate and barium sulfate; calcium metasilicate; bentonite; silica; and alumina.

On the other hand, examples of organic dispersion stabilizers include polyvinyl alcohol, gelatin, methyl cellulose, methyl hydroxypropyl cellulose, ethyl cellulose, sodium salts of carboxymethyl cellulose, polyacrylic acid and salts thereof, and starch.

In the case where an inorganic compound is used as the dispersion stabilizer, a commercially available inorganic compound may be used as is, or the inorganic compound may be generated in an aqueous medium to obtain a finer particle. For example, in the case of calcium phosphate such as hydroxyapatite or tribasic calcium phosphate, an aqueous solution of the phosphate and an aqueous solution of a calcium salt may be mixed under high-speed stirring conditions.

The aqueous medium may contain a surfactant. A known surfactant may be used. Examples of the surfactant include: anionic surfactants such as sodium dodecylbenzenesulfate and sodium oleate; cationic surfactants; amphoteric surfactants; and nonionic surfactants.

The method for manufacturing the toner using the pulverization method is not particularly limited, but preferably includes: a step of melt-kneading raw materials including the crystalline resin A and the amorphous resin B and also including a colorant, a release agent, and the like as necessary; and a step of pulverizing the obtained melt-kneaded product to obtain a toner particle. Known apparatuses may be used for melt-kneading and pulverization.

The emulsion aggregation method is not particularly limited, but preferably includes: a dispersion step of preparing solutions in which fine particles of raw materials (the crystalline resin A, the amorphous resin B, and a colorant, a release agent, etc., as necessary) of a toner particle are dispersed; an aggregation step of causing aggregation of the fine particles of raw materials of a toner particle and controlling the particle diameter of an aggregated particle until the particle diameter reaches the particle diameter of a toner particle; and a melt adhesion step of causing melt adhesion of the resins contained in the obtained aggregated particle to obtain a toner particle.

A toner particle may also be obtained by performing, as necessary, a cooling step after the above-described step, filtration, a metal removal step of removing excessive polyvalent metal ions, a filtration and washing step of washing the toner particle with ion exchange water or the like, and a drying step of removing moisture from the washed toner particle.

The following describes methods for calculating and measuring various physical properties.

Method for Measuring Storage Elastic Modulus G' and tan δ

The storage elastic modulus G' and tan δ are measured using a viscoelasticity measurement apparatus (rheometer) ARES (manufactured by Rheometrics Scientific Inc.). An overview of the measurement is described in ARES operation manuals 902-30004 (August 1997) and 902-00153 (July 1993) issued by Rheometrics Scientific Inc., as follows.

Measurement jig: torsion rectangular

Measurement sample: A rectangular parallelepiped sample with a width of 12 mm, a height of 20 mm, and a thickness of 2.5 mm is produced from the toner using a pressure molding machine (25 kN is maintained for 30 minutes at normal temperature). A 100-kN press NT-100H manufactured by NPa System Co., Ltd., is used as the pressure molding machine.

After the jig and the sample are left to stand at normal temperature (23° C.) for 1 hour, the sample is attached to the jig (see the FIGURE). As shown in the FIGURE, the sample 100 is fixed in such a manner that a measurement portion have a width of 12 mm, a thickness of 2.5 mm, and a height of 10 mm. The sample 100 is fixed in the fixing holder 110 using the fixing screw 111. The reference number 120 is the motive power transmitting member 120. After the temperature is adjusted to a measurement start temperature of 30° C. for 10 minutes, measurement is carried out under the following settings.

Measurement frequency: 6.28 rad/s

Measurement strain setting: Initial value is set to 0.1%, and measurement is carried out in an automatic measurement mode.

Sample elongation correction: Adjusted in the automatic measurement mode.

Measurement temperature: The temperature is increased from 30° C. to 150° C. at a rate of 2° C./min.

Measurement interval: Viscoelasticity data is measured at intervals of 30 seconds, i.e., intervals of 1° C.

The data is transferred via an interface to RSI Orchestrator (soft for control, data collection and analysis) (manufactured by Rheometrics Scientific Inc.) that runs on Windows2000 manufactured by Microsoft Corporation.

In the measurement data, a temperature at which the storage elastic modulus G' is $3.0\times10^7$ Pa is taken as T1[° C.], a temperature at which the storage elastic modulus G' is $1.0\times10^7$ Pa is taken as T2[° C.], and a temperature at which the storage elastic modulus G' is $3.0\times10^6$ Pa is taken as T3[° C.]. Also, a ratio (tan δ) of the loss elastic modulus G" to the storage elastic modulus G' at the temperature T2[° C.] is taken as tan δ(T2), and tan δ at a temperature: T2−10[° C.] is taken as tan δ(T2−10).

Method for Measuring Molecular Weight of Toner

The molecular weight (weight-average molecular weight Mw) of THF-soluble matter in the toner is measured using gel permeation chromatography (GPC) as described below. First, the toner is dissolved in tetrahydrofuran (THF) at room temperature over the course of 24 hours. The resulting solution is filtered through a solvent-resistant membrane filter (Maishori Disk, Tosoh Corp.) having a pore diameter of 0.2 μm to obtain a sample solution. The concentration of THF-soluble components in the sample solution is adjusted to about 0.8 mass %. Measurement is performed under the following conditions using this sample solution.

Device: HLC8120 GPC (detector: RI) (Tosoh Corp.)
Columns: Shodex KF-801, 802, 803, 804, 805, 806, 807 (total 7) (Showa Denko)
Eluent: Tetrahydrofuran (THF)
Flow rate: 1.0 mL/min
Oven temperature: 40.0° C.
Sample injection volume: 0.10 mL A molecular weight calibration curve prepared using standard polystyrene resin (such as TSK standard polystyrene F-850, F-450, F-288, F-128, F-80, F-40, F-20, F-10, F-4, F-2, F-1, A-5000, A-2500, A-1000, A-500, Tosoh Corp.) is used for calculating the molecular weights of the samples.

Method for Separating Crystalline Resin A and Amorphous Resin B from Toner

The crystalline resin A and the amorphous resin B can be separated from the toner using a known method, and the following describes an example of such a method. Gradient LC is used as a method for separating resin components from the toner. With this analysis, it is possible to separate resins included in the binder resin in accordance with polarities of the resins, irrespective of molecular weights.

First, the toner is dissolved in chloroform. Measurement is carried out using a sample that is prepared by adjusting the concentration of the sample to 0.1 mass % using chloroform and filtering the solution using a 0.45-μm PTFE filter. Gradient polymer LC measurement conditions are shown below.

Apparatus: UltiMate 3000 (manufactured by Thermo Fisher Scientific Inc.)
Mobile phase: A chloroform (HPLC), B acetonitrile (HPLC)
Gradient: 2 min (A/B=0/100)→25 min (A/B=100/0)

(The gradient of the change in mobile phase was adjusted to be linear.)

Flow rate: 1.0 mL/min
Injection: 0.1 mass %×20 μL
Column: Tosoh TSKgel ODS (4.6 mm φ×150 mm×5 μm)
Column temperature: 40° C.
Detector: Corona charged particle detector (Corona-CAD) (manufactured by Thermo Fisher Scientific Inc.)

In a time-intensity graph obtained through the measurement, the resin components can be separated into two peaks in accordance with their polarities. It is possible to separate the two types of resins by thereafter carrying out the above-described measurement again and performing isolation at times corresponding to valleys after the respective peaks. DSC measurement is performed on the separated resins, and a resin that has a melting point peak is taken as the crystalline resin A, and a resin that does not have a melting point peak is taken as the amorphous resin B.

Note that if the toner contains a release agent, it is necessary to separate the release agent from the toner. The release agent is separated by separating components having a molecular weight of 3000 or less using recycle HPLC. The following describes a measurement method. First, a chloroform solution of the toner is prepared using the above-described method. The obtained solution is filtered using a solvent-resistant membrane filter "Maishori Disk" (manufactured by Tosoh Corporation) having a pore diameter of 0.2 μtm to obtain a sample solution. Note that the concentration of chloroform-soluble matter in the sample solution is adjusted to 1.0 mass %. Measurement is carried out using the sample solution under the following conditions.

Apparatus: LC-Sakura NEXT (manufactured by Japan Analytical Industry Co., Ltd.)
Column: JAIGEL2H, 4H (manufactured by Japan Analytical Industry Co., Ltd.)
Eluent: chloroform
Flow rate: 10.0 ml/min
Oven temperature: 40.0° C.
Sample injection amount: 1.0 ml The molecular weight of the sample is calculated using a molecular weight calibration curve obtained using standard polystyrene resins (e.g., "TSK standard polystyrene F-850, F-450, F-288, F-128, F-80, F-40, F-20, F-10, F-4, F-2, F-1, A-5000, A-2500, A-1000, A-500" (product name) manufactured by Tosoh Corporation). The release agent is removed from the toner by repeatedly performing isolation of components having a molecular weight of 3000 or less using the obtained molecular weight curve.

Method for Measuring Percentages of Contents of Various Monomer Units in Resin

The percentages of contents of various monomer units in a resin are measured using $^1$H-NMR under the following conditions. The crystalline resin A and the amorphous resin B isolated using the above-described method can be used as measurement samples.

Measurement apparatus: FT NMR apparatus JNM-EX400 (manufactured by JEOL Ltd.)
Measurement frequency: 400 MHz
Pulse condition: 5.0 μs
Frequency range: 10500 Hz
Cumulative number of times: 64 times
Measurement temperature: 30° C.
Sample: Prepared by placing 50 mg of a measurement sample in a sample tube having an inner diameter of 5 mm, adding deuterated chloroform ($CDCl_3$) as a solvent, and dissolving the measurement sample in a thermostatic chamber at 40° C. The structure of each monomer unit is identified by analyzing an obtained $^1$H-NMR chart. The following describes measurement of the percentage of the content of the monomer unit (a) in the crystalline resin A as an example. In the obtained $^1$H-NMR chart, a peak that is independent of peaks attributed to constituents of other monomer units is selected from among peaks attributed to constituents of the monomer unit (a), and an integration value S1 of the selected peak is calculated. An integration value is also calculated in the same manner with respect to other monomer units included in the crystalline resin A.

If monomer units constituting the crystalline resin A are the monomer unit (a) and another monomer unit, the percentage of the content of the monomer unit (a) is determined using the integration value S1 and an integration value S2 of a peak calculated for the other monomer unit. Note that n1 and n2 each represent the number of hydrogen atoms included in a constituent to which the peak focused on with respect to the corresponding unit is attributed.

$$\text{Percentage (mol \%) of content of monomer unit } (a)=1\{(S1/n1)/((S1/n1)+(S2/n2))\}\times 100$$

In cases where the crystalline resin A includes two or more types of other monomer units, the percentage of the content of the monomer unit (a) can be calculated in the same manner (using S3 . . . Sx and n3 . . . nx).

If a polymerizable monomer that does not include a hydrogen atom in constituents other than a vinyl group is used, measurement is carried out using $^{13}$C-NMR and setting the measurement atomic nucleus to $^{13}$C in a single pulse mode, and calculation is performed in the same manner using $^{13}$H-NMR. The percentage of the content of each monomer unit is converted to a value expressed in mass % by multiplying the percentage (mol %) of the monomer unit calculated as described above by the molecular weight of the monomer unit. Measurement is carried out for the amorphous resin B as well using the same method.

Measurement of Percentage of Content of Crystalline Resin A in Toner

The percentage of the content of the crystalline resin A in the toner is calculated based on the mass of the toner before the toner is dissolved in chloroform in the above-described method for separating the crystalline resin A and the amorphous resin B from the toner and the mass of the separated crystalline resin A.

EXAMPLES

The following describes the present invention in more detail using examples, but the present invention is not limited by the examples. In formulations described below, “parts” means “parts by mass”, unless otherwise stated.

Preparation of Crystalline Resin A1

The following materials were placed in a reaction vessel equipped with a reflux condenser tube, a stirrer, a thermometer, and a nitrogen introduction tube in a nitrogen atmosphere.

| | |
|---|---|
| Toluene | 100.0 parts |
| Monomer composition | 100.0 parts |

(The monomer composition was prepared by mixing the following monomers at a ratio shown below.)

| | |
|---|---|
| (Behenyl acrylate (monomer (a)) | 80.0 parts) |
| (Styrene | 18.0 parts) |
| (Methacrylic acid | 2.0 parts) |
| Polymerization initiator: t-butyl peroxypivalate | 0.5 parts |
| (PERBUTYL PV manufactured by NOF Corporation) | |

The contents in the reaction vessel were heated to 70° C. while being stirred at 200 rpm for 12 hours to cause a polymerization reaction, and thus a solution in which a polymer of the monomer composition was dissolved in toluene was obtained. Subsequently, the temperature of the solution was reduced to 25° C., and then the solution was added to 1000.0 parts of methanol while being stirred to cause precipitation of methanol-insoluble matter. The obtained methanol-insoluble matter was filtered, washed with methanol, and dried in a vacuum at 40° C. for 24 hours to obtain a crystalline resin A1.

Preparation of Crystalline Resins A2 to A12

Crystalline resins A2 to A12 were prepared in the same manner as in the preparation of the crystalline resin A1 in all aspects other than that addition amounts of monomers included in the monomer composition were changed as shown in Table 1.

TABLE 1

| | Monomer (a) | | | Other monomer 1 | | Other monomer 2 | |
|---|---|---|---|---|---|---|---|
| Crystalline resin A No. | Type | Carbon number n | Addition amount (part) | Type | Addition amount (part) | Type | Addition amount (part) |
| A1 | Behenyl acrylate | 21 | 80.0 | Styrene | 18.0 | Methacrylic acid | 2.0 |
| A2 | Behenyl acrylate | 21 | 95.0 | Styrene | 3.0 | Methacrylic acid | 2.0 |
| A3 | Stearyl acrylate | 17 | 40 | Styrene | 18.0 | Methacrylic acid | 2.0 |
| | Behenyl acrylate | 21 | 40 | | | | |
| A4 | Behenyl acrylate | 21 | 75 | Styrene | 18.0 | Methacrylic acid | 2.0 |
| | Myricyl acrylate | 29 | 5 | | | | |
| A5 | Behenyl acrylate | 21 | 65 | Styrene | 18.0 | Methacrylic acid | 2.0 |
| | Myricyl acrylate | 29 | 15 | | | | |
| A6 | Behenyl acrylate | 21 | 48.0 | Styrene | 50.0 | Methacrylic acid | 2.0 |
| A7 | Behenyl acrylate | 21 | 52.0 | Styrene | 46.0 | Methacrylic acid | 2.0 |
| A8 | Behenyl acrylate | 21 | 73.0 | Styrene | 25.0 | Methacrylic acid | 2.0 |
| A9 | Stearyl acrylate | 17 | 50 | Styrene | 18.0 | Methacrylic acid | 2.0 |
| | Behenyl acrylate | 21 | 30 | | | | |
| A10 | Behenyl acrylate | 21 | 50 | Styrene | 18.0 | Methacrylic acid | 2.0 |
| | Myricyl acrylate | 29 | 30 | | | | |
| A11 | Behenyl acrylate | 21 | 97.0 | — | — | Methacrylic acid | 3.0 |
| A12 | Behenyl acrylate | 21 | 70.0 | Styrene | 18.0 | Methacrylonitrile | 12.0 |

Preparation of Amorphous Resin B1

The following materials were placed in a reaction vessel equipped with a reflux condenser tube, a stirrer, a thermometer, and a nitrogen introduction tube in a nitrogen atmosphere.

| | |
|---|---|
| Toluene | 100.0 parts |
| Monomer composition | 100.0 parts |

(The monomer composition was prepared by mixing the following monomers at a ratio shown below.)

| | |
|---|---|
| (Lauryl acrylate | 25.0 parts) |
| (Styrene | 75.0 parts) |
| Polymerization initiator: t-butyl peroxypivalate | 0.5 parts |
| (PERBUTYL PV manufactured by NOF Corporation) | |

The contents in the reaction vessel were heated to 70° C. while being stirred at 200 rpm for 12 hours to cause a polymerization reaction, and thus a solution in which a polymer of the monomer composition was dissolved in toluene was obtained. Subsequently, the temperature of the solution was reduced to 25° C., and then the solution was added to 1000.0 parts of methanol while being stirred to cause precipitation of methanol-insoluble matter. The obtained methanol-insoluble matter was filtered, washed with methanol, and dried in a vacuum at 40° C. for 24 hours to obtain an amorphous resin B1.

Example 1

Manufacture of Toner through Suspension Polymerization Method

Manufacture of Toner Particle 1

| | |
|---|---|
| Lauryl acrylate | 15.0 parts |
| Styrene | 45.0 parts |
| Colorant: Pigment blue 15:3 | 6.5 parts |

A mixture of the above materials was prepared. The mixture was placed in an attritor (manufactured by Nippon Coke & Engineering Co., Ltd.) and dispersed at 200 rpm for 2 hours using zirconia beads having a diameter of 5 mm to obtain a raw material dispersed solution.

On the other hand, 735.0 parts of ion exchange water and 16.0 parts of tribasic sodium phosphate (dodeca hydrate) were added into a vessel equipped with a high-speed stirrer Homomixer (manufactured by Primix Corporation) and a thermometer, and heated to 60° C. while being stirred at 12000 rpm. A calcium chloride aqueous solution obtained by dissolving 9.0 parts of calcium chloride (dihydrate) in 65.0 parts of ion exchange water was added into the vessel, and the contents in the vessel were stirred at 12000 rpm for 30 minutes while the temperature was kept at 60° C. Then, 10% hydrochloric acid was added to adjust pH to 6.0, and thus an aqueous medium in which an inorganic dispersion stabilizer containing hydroxyapatite was dispersed in water was obtained.

Subsequently, the raw material dispersed solution described above was transferred into a vessel equipped with a stirrer and a thermometer, and heated to 60° C. while being stirred at 100 rpm.

| | |
|---|---|
| Crystalline resin A1 | 40.0 parts |
| Release agent 1 | 9.0 parts |

(Release agent 1: DP18 (dipentaerythritol stearate wax, melting point: 79° C., manufactured by Nippon Seiro Co., Ltd.)

The materials shown above were added into the vessel, the contents in the vessel were stirred at 100 rpm for 30 minutes while the temperature was kept at 60° C., then 9.0 parts of t-butyl peroxypivalate (PERBUTYL PV manufactured by NOF Corporation) was added as a polymerization initiator, and the contents were further stirred for 1 minute, and then added into the aqueous medium that was being stirred at 12000 rpm using the high-speed stirrer. Stirring by the high-speed stirrer was continued at 12000 rpm for 20 minutes while the temperature was kept at 60° C. to obtain a granulation solution.

The granulation solution was transferred into a reaction vessel equipped with a reflux condenser tube, a stirrer, a thermometer, and a nitrogen introduction tube, and heated to 70° C. while being stirred at 150 rpm in a nitrogen atmosphere. Polymerization was carried out for 12 hours at 150 rpm while the temperature was kept at 70° C. to obtain a toner particle dispersed solution.

The obtained toner particle dispersed solution was cooled to 45° C. while being stirred at 150 rpm, and then subjected to heat treatment for 5 hours while the temperature was kept at 45° C. Thereafter, dilute hydrochloric acid was added until pH reached 1.5 while stirring was continued to dissolve the dispersion stabilizer. Solid contents were filtered, sufficiently washed with ion exchange water, and then dried in a vacuum at 30° C. for 24 hours to obtain a toner particle 1.

Preparation of Toner 1

2.0 parts of silica fine particles (subjected to hydrophobic treatment performed using hexamethyldisilazane, number-average particle diameter of primary particles: 10 nm, BET specific surface area: 170 $m^2/g$) was added as an external additive with respect to 98.0 parts of the toner particle 1, and the mixture was mixed at 3000 rpm for 15 minutes using a Henschel mixer (manufactured by Nippon Coke & Engineering Co., Ltd.) to obtain a toner 1. Physical properties of the obtained toner 1 are shown in Table 3, and evaluation results of the toner 1 are shown in Table 4.

TABLE 2

| | | | Binder resin | | | | | | | | |
|---|---|---|---|---|---|---|---|---|---|---|---|
| | | | | | Amorphous resin B | | | | | Crosslinking agent | |
| | | | Crystalline resin A | | Polymerizable monomer X | | | Polymerizable monomer Y | | | |
| Example No. | Toner No. | Manufacturing method | No. | Addition amount (part) | Type | Carbon number m | Addition amount (part) | Type | Addition amount (part) | Type | Addition amount (part) |
| 1 | 1 | SP | A1 | 40.0 | Lauryl acrylate | 11 | 15.0 | Styrene | 45.0 | — | — |
| 2 | 2 | SP | A2 | 20.0 | Lauryl acrylate | 11 | 20.0 | Styrene | 60.0 | — | — |
| 3 | 3 | SP | A3 | 40.0 | Lauryl acrylate | 11 | 15.0 | Styrene | 45.0 | — | — |
| 4 | 4 | SP | A4 | 40.0 | Lauryl acrylate | 11 | 15.0 | Styrene | 45.0 | — | — |

TABLE 2-continued

| | | | Binder resin | | | | | | | | |
|---|---|---|---|---|---|---|---|---|---|---|---|
| | | | | | Amorphous resin B | | | | | Crosslinking agent | |
| | | | Crystalline resin A | | Polymerizable monomer X | | | Polymerizable monomer Y | | | |
| Example No. | Toner No. | Manufacturing method | No. | Addition amount (part) | Type | Carbon number m | Addition amount (part) | Type | Addition amount (part) | Type | Addition amount (part) |
| 5 | 5 | SP | A5 | 40.0 | Lauryl acrylate | 11 | 15.0 | Styrene | 45.0 | — | — |
| 6 | 6 | SP | A1 | 40.0 | Lauryl acrylate | 11 | 15.0 | Styrene | 45.0 | HDDA | 0.2 |
| 7 | 7 | SP | A1 | 40.0 | Lauryl acrylate | 11 | 15.0 | Styrene | 45.0 | HDDA | 0.1 |
| 8 | 8 | SP | A2 | 40.0 | Lauryl acrylate | 11 | 22.8 | Styrene | 37.2 | — | — |
| 9 | 9 | SP | A2 | 45.0 | Lauryl acrylate | 11 | 23.7 | Styrene | 31.4 | — | — |
| 10 | 10 | SP | A1 | 40.0 | Lauryl acrylate | 11 | 1.8 | Styrene | 58.2 | — | — |
| 11 | 11 | SP | A1 | 40.0 | Lauryl acrylate | 11 | 4.8 | Styrene | 55.2 | — | — |
| 12 | 12 | SP | A1 | 40.0 | Lauryl acrylate | 11 | 22.8 | Styrene | 37.2 | — | — |
| 13 | 13 | SP | A1 | 40.0 | Lauryl acrylate | 11 | 25.8 | Styrene | 34.2 | — | — |
| 14 | 14 | SP | A6 | 40.0 | Lauryl acrylate | 11 | 15.0 | Styrene | 45.0 | — | — |
| 15 | 15 | SP | A7 | 40.0 | Lauryl acrylate | 11 | 15.0 | Styrene | 45.0 | — | — |
| 16 | 16 | SP | A8 | 40.0 | Lauryl acrylate | 11 | 15.0 | Styrene | 45.0 | — | — |
| 17 | 17 | SP | A1 | 10.0 | Lauryl acrylate | 11 | 22.5 | Styrene | 67.5 | — | — |
| 18 | 18 | SP | A1 | 12.0 | Lauryl acrylate | 11 | 22.0 | Styrene | 66.0 | — | — |
| 19 | 19 | SP | A1 | 55.0 | Lauryl acrylate | 11 | 11.3 | Styrene | 33.8 | — | — |
| 20 | 20 | SP | A1 | 80.0 | Lauryl acrylate | 11 | 5.0 | Styrene | 15.0 | — | — |
| 21 | 21 | SP | A1 | 85.0 | Lauryl acrylate | 11 | 3.8 | Styrene | 11.3 | — | — |
| 22 | 22 | SP | A1 | 40.0 | n-butyl acrylate | 3 | 15.0 | Styrene | 45.0 | — | — |
| 23 | 23 | SP | A1 | 40.0 | Octyl acrylate | 7 | 15.0 | Styrene | 45.0 | — | — |
| 24 | 24 | SP | A1 | 40.0 | Lauryl acrylate | 11 | 15.0 | Methyl methacrylate | 45.0 | — | — |
| 25 | 25 | SP | A1 | 40.0 | Lauryl acrylate | 11 | 15.0 | t-butyl methacrylate | 45.0 | — | — |
| 28 | 28 | SP | A12 | 40.0 | Lauryl acrylate | 11 | 15.0 | Styrene | 45.0 | — | — |
| 29 | 29 | SP | A12 | 40.0 | n-butyl acrylate | 3 | 15.0 | Styrene | 45.0 | — | — |
| C.E. 1 | C. 1 | SP | A2 | 10.0 | Lauryl acrylate | 11 | 22.5 | Styrene | 67.5 | — | — |
| C.E. 2 | C. 2 | SP | A9 | 40.0 | Lauryl acrylate | 11 | 15.0 | Styrene | 45.0 | — | — |
| C.E. 3 | C. 3 | SP | A10 | 40.0 | Lauryl acrylate | 11 | 15.0 | Styrene | 45.0 | — | — |
| C.E. 4 | C. 4 | SP | A1 | 40.0 | Lauryl acrylate | 11 | 15.0 | Styrene | 45.0 | HDDA | 0.5 |
| C.E. 5 | C. 5 | SP | A2 | 45.0 | Lauryl acrylate | 11 | 23.7 | Styrene | 31.4 | — | — |
| C.E. 6 | C. 6 | SP | A1 | 40.0 | — | — | — | Styrene | 60.0 | — | — |
| C.E. 7 | C. 7 | SP | A1 | 40.0 | Lauryl acrylate | 11 | 33.0 | Styrene | 27.0 | — | — |
| C.E. 9 | C. 9 | SP | A11 | 40.2 | n-butyl acrylate | 3 | 12.0 | Styrene | 47.8 | | |

In the above table, "C.E." indicates "Comparative example", "C." indicates "Comparative", "SP" indicates "Suspension polymerization method", and HDDA represents hexanediol diacrylate.

TABLE 3

| Example No. | Toner No. | Manufacturing method | T3 − T1 (° C.) | T2 (° C.) | tanδ(T2) | tanδ(T2)/tanδ(T2 − 10) | content (a) mass % | Percentage of crystalline resin A in toner (mass %) | content (b) mass % | Mw of toner |
|---|---|---|---|---|---|---|---|---|---|---|
| 1 | 1 | SP | 6 | 59 | 0.55 | 1.68 | 80.0 | 34.0 | 25.0 | 102500 |
| 2 | 2 | SP | 9 | 59 | 0.53 | 1.23 | 95.0 | 17.0 | 25.0 | 103800 |
| 3 | 3 | SP | 6 | 51 | 0.56 | 1.67 | 80.0 | 34.0 | 25.0 | 98900 |
| 4 | 4 | SP | 6 | 63 | 0.56 | 1.66 | 80.0 | 34.0 | 25.0 | 89800 |
| 5 | 5 | SP | 6 | 68 | 0.54 | 1.73 | 80.0 | 34.0 | 25.0 | 98900 |
| 6 | 6 | SP | 7 | 59 | 0.32 | 1.61 | 80.0 | 34.0 | 25.0 | 123200 |
| 7 | 7 | SP | 6 | 59 | 0.42 | 1.69 | 80.0 | 34.0 | 25.0 | 121200 |
| 8 | 8 | SP | 6 | 59 | 0.86 | 1.66 | 95.0 | 34.0 | 38.0 | 99900 |
| 9 | 9 | SP | 6 | 57 | 0.96 | 1.68 | 95.0 | 38.3 | 43.0 | 83590 |
| 10 | 10 | SP | 6 | 59 | 0.58 | 1.06 | 80.0 | 34.0 | 3.0 | 82640 |
| 11 | 11 | SP | 6 | 59 | 0.59 | 1.22 | 80.0 | 34.0 | 8.0 | 96700 |
| 12 | 12 | SP | 6 | 59 | 0.55 | 1.76 | 80.0 | 34.0 | 38.0 | 110080 |
| 13 | 13 | SP | 6 | 59 | 0.55 | 1.88 | 80.0 | 34.0 | 43.0 | 94800 |
| 14 | 14 | SP | 10 | 66 | 0.33 | 1.11 | 48.0 | 34.0 | 25.0 | 101050 |
| 15 | 15 | SP | 9 | 64 | 0.38 | 1.23 | 52.0 | 34.0 | 25.0 | 93800 |
| 16 | 16 | SP | 7 | 60 | 0.49 | 1.55 | 73.0 | 34.0 | 25.0 | 99800 |
| 17 | 17 | SP | 9 | 67 | 0.34 | 1.09 | 80.0 | 8.5 | 25.0 | 110050 |
| 18 | 18 | SP | 8 | 64 | 0.36 | 1.13 | 80.0 | 10.2 | 25.0 | 101800 |
| 19 | 19 | SP | 6 | 59 | 0.67 | 1.73 | 80.0 | 46.8 | 25.0 | 81800 |
| 20 | 20 | SP | 6 | 60 | 0.87 | 1.79 | 80.0 | 68.1 | 25.0 | 66800 |
| 21 | 21 | SP | 5 | 60 | 0.95 | 1.87 | 80.0 | 72.3 | 25.0 | 62800 |
| 22 | 22 | SP | 6 | 59 | 0.33 | 1.11 | 80.0 | 34.0 | — | 97800 |

TABLE 3-continued

| Example No. | Toner No. | Manufacturing method | T3 − T1 (° C.) | T2 (° C.) | tanδ(T2) | tanδ(T2)/ tanδ(T2 − 10) | content (a) mass % | Percentage of crystalline resin A in toner (mass %) | content (b) mass % | Mw of toner |
|---|---|---|---|---|---|---|---|---|---|---|
| 23 | 23 | SP | 6 | 59 | 0.43 | 1.21 | 80.0 | 34.0 | 25.0 | 96900 |
| 24 | 24 | SP | 6 | 59 | 0.55 | 1.68 | 80.0 | 34.0 | 25.0 | 101800 |
| 25 | 25 | SP | 6 | 59 | 0.55 | 1.68 | 80.0 | 34.0 | 25.0 | 101400 |
| 26 | 26 | EA | 6 | 59 | 0.56 | 1.67 | 80.0 | 34.0 | 25.0 | 86800 |
| 27 | 27 | P | 6 | 59 | 0.54 | 1.66 | 80.0 | 34.0 | 25.0 | 87400 |
| 28 | 28 | SP | 6 | 60 | 0.49 | 1.55 | 70.0 | 34.0 | 25.0 | 96800 |
| 29 | 29 | SP | 6 | 60 | 0.35 | 1.19 | 70.0 | 34.0 | — | 100580 |
| C.E. 1 | C. 1 | SP | 12 | 59 | 0.55 | 1.22 | 95.0 | 8.5 | 25.0 | 101800 |
| C.E. 2 | C. 2 | SP | 6 | 48 | 0.56 | 1.67 | 80.0 | 34.0 | 25.0 | 93900 |
| C.E. 3 | C. 3 | SP | 6 | 73 | 0.54 | 1.73 | 80.0 | 34.0 | 25.0 | 99580 |
| C.E. 4 | C. 4 | SP | 7 | 59 | 0.28 | 1.66 | 80.0 | 33.9 | 25.0 | 100600 |
| C.E. 5 | C. 5 | SP | 6 | 57 | 1.18 | 1.68 | 95.0 | 38.3 | 43.0 | 110050 |
| C.E. 6 | C. 6 | SP | 6 | 59 | 0.58 | 0.95 | 80.0 | 34.0 | 0.0 | 100480 |
| C.E. 7 | C. 7 | SP | 6 | 59 | 0.55 | 1.99 | 80.0 | 34.0 | 55.0 | 94780 |
| C.E. 8 | C. 8 | SP | 5 | 59 | 0.52 | 2.77 | 67.0 | 83.7 | — | 56300 |
| C.E. 9 | C. 9 | SP | 6 | 61 | 0.21 | 1.09 | 97.0 | 34.2 | 0.0 | 48900 |

In the above table, "C.E." indicates "Comparative example", "C." indicates "Comparative", "SP" indicates "Suspension polymerization method", "EA" indicates "Emulsion aggregation method", "P" indicates "Pulverization method", "content (a)" indicates "Percentage of content of monomer unit (a) in crystalline resin A (mass %)", "content (b)" indicates "Percentage of content of monomer unit (b) in amorphous resin B (mass %)", and "Mw of toner" means the weight-average molecular weight Mw of THF-soluble matter in the toner.

Examples 2 to 25, 28, and 29

Toner particles 2 to 25, 28, and 29 were obtained in the same manner as in Example 1 in all aspects other than that types and addition amounts of polymerizable monomers used were changed as shown in Table 2.

Furthermore, toners 2 to 25, 28, and 29 were obtained by adding an external additive in the same manner as in Example 1. Physical properties of the toners are shown in Table 3, and evaluation results of the toners are shown in Table 4. It was confirmed through the above-described analysis that each of the toners 1 to 25, 28, and 29 contained monomer units forming the crystalline resin A at the same ratio as that in the formulation shown in Table 1. Also, monomer units forming the amorphous resin B were contained at the same ratio as that in the formulation shown in Table 2.

Example 26

Manufacture of Toner through Emulsion Aggregation Method

Preparation of Crystalline Resin Dispersed Solution

| | |
|---|---|
| Toluene | 300.0 parts |
| Crystalline resin A1 | 100.0 parts |

The above materials were weighed and mixed, and the crystalline resin A1 was dissolved at 90° C.

Separately from the above materials, 5.0 parts of sodium dodecylbenzenesulfonate and 10.0 parts of sodium laurate were added to 700.0 parts of ion exchange water, and heated and dissolved at 90° C. Next, the toluene solution and the aqueous solution were mixed and stirred at 7000 rpm using an ultrahigh-speed stirrer T.K. ROBOMIX (manufactured by Primix Corporation). Furthermore, the mixture was emulsified at a pressure of 200 MPa using a high-pressure impact-type disperser Nanomizer (manufactured by Yoshida Kikai Co., Ltd.). Thereafter, toluene was removed using an evaporator and the concentration was adjusted using ion exchange water, and thus a crystalline resin dispersed solution containing fine particles of the crystalline resin A1 at a concentration of 20% was obtained.

A 50% particle diameter (D50) on the volume basis of the fine particles of the crystalline resin A1 was measured using a dynamic light scattering particle size distribution analyzer Nanotrac UPA-EX150 (manufactured by Nikkiso Co., Ltd.) and found to be 0.40 μm.

Preparation of Amorphous Resin Dispersed Solution

| | |
|---|---|
| Toluene | 300.0 parts |
| Amorphous resin B1 | 100.0 parts |

The above materials were weighed and mixed, and the amorphous resin B1 was dissolved at 90° C.

Separately from the above materials, 5.0 parts of sodium dodecylbenzenesulfonate and 10.0 parts of sodium laurate were added to 700.0 parts of ion exchange water, and heated and dissolved at 90° C. Next, the toluene solution and the aqueous solution were mixed and stirred at 7000 rpm using the ultrahigh-speed stirrer T.K. ROBOMIX (manufactured by Primix Corporation).

Furthermore, the mixture was emulsified at a pressure of 200 MPa using the high-pressure impact-type disperser Nanomizer (manufactured by Yoshida Kikai Co., Ltd.). Thereafter, toluene was removed using an evaporator and the concentration was adjusted using ion exchange water to obtain an amorphous resin dispersed solution containing fine particles of the amorphous resin at a concentration of 20%.

A 50% particle diameter (D50) on the volume basis of the fine particles of the amorphous resin was measured using the dynamic light scattering particle size distribution analyzer Nanotrac UPA-EX150 (manufactured by Nikkiso Co., Ltd.) and found to be 0.38 μm.

Preparation of Release Agent Dispersed Solution

| | |
|---|---|
| Release agent 1 | 100.0 parts |
| Anionic surfactant NEOGEN RK (manufactured by DKS Co., Ltd.) | 5.0 parts |
| Ion exchange water | 395.0 parts |

The above materials were weighed and placed in a mixing vessel equipped with a stirrer, then heated to 90° C., and subjected to dispersion treatment for 60 minutes by being circulated through CLEARMIX W-MOTION (manufactured by M Technique Co., Ltd.). The dispersion treatment was performed under the following conditions.

Rotor outer diameter: 3 cm

Clearance: 0.3 mm

Rotor revolution speed: 19000 r/min

Screen revolution speed: 19000 r/min

After the dispersion treatment, cooling treatment was performed at a rotor revolution speed of 1000 r/min, a screen revolution speed of 0 r/min, and a cooling rate of 10° C./min to cool the solution to 40° C., and thus a release agent dispersed solution containing fine particles of the release agent at a concentration of 20% was obtained.

A 50% particle diameter (D50) on the volume basis of the fine particles of the release agent was measured using the dynamic light scattering particle size distribution analyzer Nanotrac UPA-EX150 (manufactured by Nikkiso Co., Ltd.) and found to be 0.15 μm.

Preparation of Colorant Dispersed Solution

| | |
|---|---|
| Colorant (Cyan pigment: Pigment Blue 15:3 manufactured by Dainichiseika Color & Chemicals Mfg. Co., Ltd.) | 50.0 parts |
| Anionic surfactant NEOGEN RK (manufactured by DKS Co., Ltd.) | 7.5 parts |
| Ion exchange water | 442.5 parts |

The above materials were weighed, mixed, dissolved, and dispersed for 1 hour using the high-pressure impact-type disperser Nanomizer (manufactured by Yoshida Kikai Co., Ltd.) to obtain a colorant dispersed solution in which fine particles of the colorant were dispersed at a concentration of 10%.

A 50% particle diameter (D50) on the volume basis of the fine particles of the colorant was measured using the dynamic light scattering particle size distribution analyzer Nanotrac UPA-EX150 (manufactured by Nikkiso Co., Ltd.) and found to be 0.20 μm.

Manufacture of Toner 26

| | |
|---|---|
| Crystalline resin dispersed solution | 200.0 parts |
| Amorphous resin dispersed solution | 300.0 parts |
| Release agent dispersed solution | 45.0 parts |
| Colorant dispersed solution | 65.0 parts |
| Ion exchange water | 160.0 parts |

The above materials were placed in a round-bottom flask made of stainless steel and mixed. Subsequently, the materials were dispersed at 5000 r/min for 10 minutes using a homogenizer ULTRA-TURRAX T50 (manufactured by IKA). pH was adjusted to 3.0 by adding a 1.0% nitric acid aqueous solution, and then the liquid mixture was heated to 58° C. in a heating water bath while the revolution speed of a stirring blade was adjusted as appropriate so that the liquid mixture was stirred.

A volume-average particle diameter of the thus formed aggregated particles was checked as appropriate using Coulter Multisizer III, and when aggregated particles having a weight-average particle diameter (D4) of 6.0 μm were formed, pH was adjusted to 9.0 using a 5% sodium hydroxide aqueous solution. Thereafter, the liquid mixture was heated to 75° C. while stirring was continued. The temperature of the liquid mixture was kept at 75° C. for 1 hour to cause melt adhesion of the aggregated particles.

Thereafter, the liquid mixture was cooled to 45° C. and subjected to heat treatment for 5 hours. Thereafter, the liquid mixture was cooled to 25° C. and filtered to separate solids from the liquid, and the solids were washed with ion exchange water. After washing had been finished, drying was performed using a vacuum dryer, and thus a toner particle 26 having a weight-average particle diameter (D4) of 6.1 μm was obtained.

A toner 26 was obtained by adding an external additive to the toner particle 26 in the same manner as in Example 1. Physical properties of the toner 26 are shown in Table 3, and evaluation results of the toner 26 are shown in Table 4. It was confirmed through the above-described analysis that the toner 26 contained monomer units forming the crystalline resin A1 at the same ratio as that in the formulation adopted in the manufacture of the crystalline resin A1. Also, monomer units forming the amorphous resin B1 were contained at the same ratio as that in the formulation adopted in the manufacture of the amorphous resin B1.

Example 27

Manufacture of Toner through Pulverization Method

| | |
|---|---|
| Crystalline resin A1 | 40.0 parts |
| Amorphous resin B1 | 60.0 parts |
| C.I. Pigment blue 15:3 | 6.5 parts |
| Release agent 1 | 9.0 parts |

The above materials were preliminary mixed using an FM mixer (manufactured by Nippon Coke & Engineering Co., Ltd.), and then melt-kneaded using a twin screw kneader-extruder (model PCM-30, manufactured by Ikegai Ironworks Corp.).

The obtained kneaded product was cooled, coarsely pulverized using a hammer mill, and then pulverized using a mechanical pulverizer (T-250 manufactured by Turbo Kogyo Co., Ltd.), and the obtained finely pulverized powder was classified using a multi-grade classifier using the Coanda effect, and thus a toner particle 27 having a weight-average particle diameter (D4) of 6.9 μm was obtained.

A toner 27 was obtained by adding an external additive to the toner particle 27 in the same manner as in Example 1. Physical properties of the toner 27 are shown in Table 3, and evaluation results of the toner 27 are shown in Table 4. It was confirmed through the above-described analysis that the toner 27 contained the monomer units forming the crystalline resin A1 at the same ratio as that in the formulation adopted in the manufacture of the crystalline resin A1. Also, the monomer units forming the amorphous resin B1 were contained at the same ratio as that in the formulation adopted in the manufacture of the amorphous resin B1.

Comparative Examples 1 to 7

Comparative toner particles 1 to 7 were obtained in the same manner as in Example 1 in all aspects other than that types and addition amounts of polymerizable monomers used were changed as shown in Table 1.

Furthermore, comparative toners 1 to 7 were obtained by adding an external additive in the same manner as in Example 1. Physical properties of the toners are shown in Table 3, and evaluation results of the toners are shown in Table 4. Each of the comparative toners 1 to 7 contained monomer units forming the crystalline resin A at the same ratio as that in the formulation shown in Table 1. Also, monomer units forming the amorphous resin B were contained at the same ratio as that in the formulation shown in Table 2.

Comparative Example 8

| | |
|---|---|
| Monomer composition | 100.0 parts |

(The monomer composition was obtained by mixing behenyl acrylate, methacrylonitrile, and styrene at a ratio shown below.)

| | |
|---|---|
| (Behenyl acrylate | 67.0 parts) |
| (Methacrylonitrile | 22.0 parts) |
| (Styrene | 11.0 parts) |
| Pigment blue 15:3 | 6.5 parts |
| Di-t-butyl aluminum salicylate | 1.0 part |
| Release agent 2 | 10.0 parts |
| (Release agent 2: EXCEREX 30050B, molecular weight (Mp): 2700, melting point: 91° C., manufactured by Mitsui Chemicals, Inc.) | |
| Toluene | 100.0 parts |

A mixture of the above materials was prepared. The mixture was placed in an attritor (manufactured by Nippon Coke & Engineering Co., Ltd.) and dispersed at 200 rpm for 2 hours using zirconia beads having a diameter of 5 mm to obtain a raw material dispersed solution.

On the other hand, 735.0 parts of ion exchange water and 16.0 parts of tribasic sodium phosphate (dodeca hydrate) were added into a vessel equipped with a high-speed stirrer Homomixer (Primix Corporation) and a thermometer, and heated to 60° C. while being stirred at 12000 rpm. A calcium chloride aqueous solution obtained by dissolving 9.0 parts of calcium chloride (dihydrate) in 65.0 parts of ion exchange water was added into the vessel, and the contents in the vessel were stirred at 12000 rpm for 30 minutes while the temperature was kept at 60° C. Then, 10% hydrochloric acid was added to adjust pH to 6.0, and thus an aqueous medium containing a dispersion stabilizer was obtained.

Subsequently, the raw material dispersed solution described above was transferred into a vessel equipped with a stirrer and a thermometer, and heated to 60° C. while being stirred at 100 rpm. Then, 8.0 parts of t-butyl peroxypivalate (PERBUTYL PV manufactured by NOF Corporation) was added as a polymerization initiator, and the contents were stirred at 100 rpm for 5 minutes while the temperature was kept at 60° C., and then added into the aqueous medium that was being stirred at 12000 rpm using the high-speed stirrer. Stirring by the high-speed stirrer was continued at 12000 rpm for 20 minutes while the temperature was kept at 60° C. to obtain a granulation solution.

The granulation solution was transferred into a reaction vessel equipped with a reflux condenser tube, a stirrer, a thermometer, and a nitrogen introduction tube, and heated to 70° C. while being stirred at 150 rpm in a nitrogen atmosphere. Polymerization was carried out for 10 hours at 150 rpm while the temperature was kept at 70° C. Thereafter, the reflux condenser tube was removed from the reaction vessel, the reaction solution was heated to 95° C. and stirred at 150 rpm for 5 hours while the temperature was kept at 95° C. to remove toluene, and thus a toner particle dispersed solution was obtained.

The obtained toner particle dispersed solution was cooled to 20° C. while being stirred at 150 rpm, and dilute hydrochloric acid was added until pH reached 1.5 while stirring was continued to dissolve the dispersion stabilizer. Solid contents were filtered, sufficiently washed with ion exchange water, and then dried in a vacuum at 40° C. for 24 hours to obtain a comparative toner particle 8.

A comparative toner 8 was obtained by adding an external additive to the comparative toner particle 8 in the same manner as in Example 1. Physical properties of the obtained comparative toner 8 are shown in Table 3, and evaluation results of the comparative toner 8 are shown in Table 4. It was confirmed through the above-described analysis that the comparative toner 8 contained monomer units forming the binder resin at the same ratio as that in the formulation described above.

Comparative Example 9

The following materials were dispersed using an attritor (manufactured by Mitsui Miike Chemical Machinery Co., Ltd.) to obtain a polymerizable monomer composition.

| | |
|---|---|
| Crystalline resin A11 | 40.2 parts |
| Styrene | 47.8 parts |
| n-butyl acrylate | 12.0 parts |
| Pigment blue 15:3 (Dainichiseika Color & Chemicals Mfg. Co., Ltd.) | 6.5 parts |
| Release agent: paraffin wax (HNP-51 manufactured by Nippon Seiro Co., Ltd., melting point: 74° C.) | 9.0 parts |
| Toluene | 100.0 parts |

Also, 800 parts of ion exchange water and 15.5 parts of tricalcium phosphate were added into a vessel equipped with a high-speed stirrer TK-homomixer (manufactured by Tokushu Kika Kogyo Co., Ltd.), and heated to 70° C. with the revolution speed set to 15000 rpm to obtain a dispersion medium.

The polymerizable monomer composition was heated to 60° C., and after it was confirmed that the crystalline resin All had been dissolved, 6.0 parts of t-butyl peroxypivalate was added as a polymerization initiator, and the polymerizable monomer composition containing the polymerization initiator was added into the dispersion medium. A granulating step was performed for 20 minutes using the high-speed stirrer while the revolution speed was kept at 12000 rpm. Thereafter, the high-speed stirrer was replaced with a propeller stirring blade, and polymerization was carried out for 10.0 hours while stirring was continued at 150 rpm and the temperature of the solution inside the vessel was kept at 70° C. After the polymerization step, the temperature of the solution was increased to 95° C., and unreacted polymerizable monomers and toluene were removed through distillation.

The obtained toner particle dispersed solution was cooled to 45° C. while being stirred at 150 rpm, and then subjected to heat treatment for 5 hours while the temperature was kept at 45° C. Thereafter, dilute hydrochloric acid was added until pH reached 1.5 while stirring was continued to dissolve the dispersion stabilizer. Solid contents were filtered, sufficiently washed with ion exchange water, and then dried in a vacuum at 30° C. for 24 hours to obtain a comparative toner particle 9.

A comparative toner 9 was obtained by adding an external additive to the comparative toner particle 9 in the same manner as in Example 1. Physical properties of the obtained comparative toner 9 are shown in Table 3, and evaluation results of the comparative toner 9 are shown in Table 4. It was confirmed through the above-described analysis that the comparative toner 9 contained monomer units forming the crystalline resin All at the same ratio as that in the formulation shown in Table 1. Also, the comparative toner 9 contained monomer units forming the amorphous resin at the same ratio as that in the formulation described above.

Method for Evaluating Toner

<1> Low-Temperature Fixability

A process cartridge filled with a toner was left to stand in an environment at a temperature of 25° C. and a humidity of 40% RH for 48 hours. An unfixed image of rectangular image patterns having a size of 10 mm×10 mm and arranged at 9 points at regular intervals over the entire transfer paper was output using LBP-712Ci that had been modified so as to operate even if a fixing unit was removed. A toner laid-on level on the transfer paper was set to 0.80 mg/cm$^2$, and a fixing onset temperature was evaluated. Note that A4 paper ("prober bond paper" manufactured by Fox River Paper Co., 105 g/m$^2$) was used as the transfer paper.

The fixing unit of LBP-712Ci was taken out, and an external fixing unit configured to operate even outside a laser beam printer was used. The image was fixed using the external fixing unit at a process speed of 240 mm/sec by increasing the fixation temperature each time by 5° C. from 90° C.

The fixed image was visually observed, and the lowest temperature at which cold offset did not occur was taken as the fixing onset temperature, and low-temperature fixability was evaluated based on the following criteria. Evaluation results are shown in Table 4.

Evaluation Criteria

A: The fixing onset temperature was 100° C. or lower.

B: The fixing onset temperature was from 105° C. to 110° C.

C: The fixing onset temperature was from 115° C. to 120° C.

D: The fixing onset temperature was 125° C. or higher.

<2> Abrasion Resistance of Fixed Image

The fixed image fixed at the fixing onset temperature in the evaluation <1> described above was used. An image region of the obtained fixed image was covered with soft thin paper (e.g., "DUSPER" (product name) manufactured by Ozu Corporation), and rubbed back and forth 5 times with a load of 4.9 kPa applied from above the thin paper. An image density was measured before and after rubbing, and an image density reduction percentage ΔD (%) was calculated using the following expression. ΔD (%) was taken as an index of abrasion resistance.

$$\Delta D(\%)=\{(\text{image density before rubbing}-\text{image density after rubbing})/\text{image density before rubbing}\}\times 100$$

The image density was measured using a color reflection densitometer (X-Rite 404A manufactured by X-Rite, Inc.). Evaluation results are shown in Table 4.

Evaluation Criteria

A: The density reduction percentage was less than 3.0%.

B: The density reduction percentage was 3.0% or more and less than 7.0%.

C: The density reduction percentage was 7.0% or more and less than 10.0%.

D: The density reduction percentage was 10.0% or more.

<3> Evaluation of Gloss and Gloss Non-Uniformity

The fixed image fixed at the fixing onset temperature in the evaluation <1> described above was used. A gloss value was measured using a handy gloss meter PG-1 (manufactured by Nippon Denshoku Industries Co., Ltd.). The gloss value was measured for each of the image patterns arranged at 9 points with a light emitting angle and a light receiving angle set to 75°, and an average value of the measured gloss values was evaluated. Also, gloss non-uniformity was evaluated based on a standard deviation of the measured values. Evaluation results are shown in Table 4.

Gloss Evaluation Criteria

A: The average gloss value was 25.0 or more.

B: The average gloss value was 20.0 or more and less than 25.0.

C: The average gloss value was 15.0 or more and less than 20.0.

D: The average gloss value was less than 15.0.

Gloss Non-Uniformity Evaluation Criteria

A: The standard deviation of gloss was 1.00 or less.

B: The standard deviation of gloss was more than 1.00 and 2.00 or less.

C: The standard deviation of gloss was more than 2.00 and 3.00 or less.

D: The standard deviation of gloss was more than 3.00.

<4> Durability 3000 pints of an image with a print percentage of 2% were output using a printer LBP-712Ci in a high-temperature high-humidity environment (temperature: 32.5° C., humidity: 80%RH). After the printer was left to stand for 3 days, a print of an image including a blank section was output. The reflectance of the obtained image was measured using a reflectometer (model TC-6DS manufactured by Tokyo Denshoku Co., Ltd.). An amber filter was used in the measurement.

A difference: Dr−Ds between the reflectance Dr (%) of the transfer material before the image was formed and the worst value Ds (%) of the reflectance of the blank section was taken as a fogging density, and evaluated based on the following criteria. Evaluation results are shown in Table 4.

Evaluation Criteria

A: The fogging density was less than 1.0%.

B: The fogging density was 1.0% or more and less than 3.0%.

C: The fogging density was 3.0% or more and less than 5.0%.

D: The fogging density was 5.0% or more.

<5> Heat-Resistant Storability

The heat-resistant storability was evaluated to evaluate stability of the toner when the toner was stored. 5 g of the toner was placed in a resin cup with a capacity of 100 ml, and left to stand in an environment at a temperature of 50° C. and a humidity of for 3 days, and then a degree of agglomeration of the toner was measured as described below, and evaluated based on a criteria shown below.

A measurement apparatus was prepared by connecting a digital display vibrometer "DIGI-VIBRO MODEL 1332A" (manufactured by Showa Sokki Corporation) to a side surface of a vibration table of "Powder Tester" (manufactured by Hosokawa Micron Corporation). A sieve with an opening size of 38 μm (400 mesh), a sieve with an opening size of 75 μm (200 mesh), and a sieve with an opening size of 150 μm (100 mesh) were overlaid on each other in this order from below on the vibration table of Powder Tester. The measurement was carried out as described below in an environment at a temperature of 23° C. and a humidity of 60%R H.

(1) A vibration width of the vibration table was adjusted in advance such that a displacement value of the digital display vibrometer became 0.60 mm (peak-to-peak).

(2) The toner left to stand for 3 days as described above was left to stand in an environment at a temperature of 23° C. and a humidity of 60% RH for 24 hours in advance, and then 5.00 g of the toner was precisely weighed and gently placed on the uppermost sieve with the opening size of 150 μm.

(3) After the sieves were vibrated for 15 seconds, masses of the toner left on the respective sieves were measured, and the degree of agglomeration was calculated using the following expression. Evaluation results are shown in Table 4.

Degree of agglomeration (%)={(mass (g) of sample on sieve with opening size of 150 μm)/5.00 (g)}×100 +{(mass (g) of sample on sieve with opening size of 75 μm)/5.00 (g)}×100 ×0.6+{(mass (g) of sample on sieve with opening size of 38 μm)/5.00 (g)}×100 ×0.2

Evaluation Criteria

A: The degree of agglomeration was less than 10.0%

B: The degree of agglomeration was 10.0% or more and less than 15.0%.

C: The degree of agglomeration was 15.0% or more and less than 20.0%.

D: The degree of agglomeration was 20.0% or more.

TABLE 4

| Example No. | Toner No. | Low-temerature fixability Cold offset: Fixing onset temperature ° C. | Rank | Low-temerature fixability Abrasion resistance: DR (%) | Rank | Gloss: Average gloss value | Rank | Gloss non-uniformity: Standard deviation of gloss | Rank | Durability: Fogging density | Rank | Heat-resistant storability: DA | Rank |
|---|---|---|---|---|---|---|---|---|---|---|---|---|---|
| 1 | 1 | 95 | A | 1.9 | A | 25.8 | A | 0.62 | A | 0.6 | A | 6.8 | A |
| 2 | 2 | 115 | C | 4.3 | B | 25.2 | A | 0.65 | A | 0.6 | A | 6.8 | A |
| 3 | 3 | 90 | A | 1.8 | A | 25.3 | A | 0.66 | A | 0.5 | A | 17.3 | C |
| 4 | 4 | 105 | B | 1.7 | A | 25.7 | A | 0.62 | A | 0.7 | A | 7.2 | A |
| 5 | 5 | 120 | C | 1.7 | A | 25.9 | A | 0.68 | A | 0.7 | A | 6.9 | A |
| 6 | 6 | 100 | A | 1.8 | A | 15.8 | C | 0.58 | A | 0.6 | A | 7.5 | A |
| 7 | 7 | 100 | A | 1.9 | A | 20.8 | B | 0.59 | A | 0.7 | A | 7.3 | A |
| 8 | 8 | 100 | A | 2.0 | A | 27.8 | A | 1.82 | B | 0.6 | A | 6.7 | A |
| 9 | 9 | 100 | A | 2.0 | A | 28.2 | A | 2.68 | C | 0.7 | A | 6.7 | A |
| 10 | 10 | 100 | A | 8.9 | C | 25.8 | A | 0.61 | A | 0.7 | A | 6.1 | A |
| 11 | 11 | 100 | A | 4.4 | B | 25.8 | A | 0.65 | A | 0.7 | A | 6.1 | A |
| 12 | 12 | 100 | A | 1.8 | A | 25.9 | A | 1.88 | B | 0.6 | A | 6.8 | A |
| 13 | 13 | 100 | A | 1.7 | A | 25.9 | A | 2.66 | C | 0.8 | A | 7.7 | A |
| 14 | 14 | 120 | C | 7.9 | C | 15.9 | C | 0.33 | A | 0.7 | A | 6.4 | A |
| 15 | 15 | 115 | C | 4.3 | B | 16.8 | C | 0.42 | A | 0.6 | A | 6.1 | A |
| 16 | 16 | 100 | A | 1.9 | A | 25.2 | A | 0.62 | A | 0.7 | A | 6.5 | A |
| 17 | 17 | 120 | C | 8.8 | C | 15.3 | C | 0.34 | A | 0.7 | A | 6.8 | A |
| 18 | 18 | 105 | B | 7.7 | C | 16.2 | C | 0.36 | A | 0.8 | A | 6.4 | A |
| 19 | 19 | 100 | A | 1.8 | A | 25.8 | A | 0.99 | A | 0.7 | A | 6.7 | A |
| 20 | 20 | 100 | A | 1.8 | A | 27.8 | A | 1.91 | B | 0.9 | A | 6.9 | A |
| 21 | 21 | 100 | A | 1.8 | A | 28.1 | A | 2.89 | C | 1.8 | B | 7.1 | A |
| 22 | 22 | 100 | A | 8.8 | C | 15.2 | C | 0.69 | A | 3.1 | B | 7.3 | A |
| 23 | 23 | 100 | A | 4.5 | B | 21.3 | B | 0.52 | A | 2.9 | B | 7.3 | A |
| 24 | 24 | 100 | A | 1.8 | A | 25.8 | A | 0.62 | A | 0.7 | A | 7.3 | A |
| 25 | 25 | 100 | A | 1.9 | A | 25.5 | A | 0.65 | A | 0.8 | A | 7.1 | A |
| 26 | 26 | 100 | A | 1.9 | A | 25.3 | A | 0.65 | A | 0.7 | A | 8.3 | A |
| 27 | 27 | 100 | A | 2.0 | A | 25.2 | A | 0.62 | A | 0.7 | A | 8.8 | A |
| 28 | 28 | 100 | A | 1.8 | A | 25.2 | A | 0.62 | A | 0.6 | A | 8.8 | A |
| 29 | 29 | 100 | A | 8.7 | C | 16.4 | C | 0.69 | A | 2.9 | B | 7.3 | A |
| C.E. 1 | C. 1 | 130 | D | 4.7 | B | 25.8 | A | 0.55 | A | 0.8 | A | 6.9 | A |
| C.E. 2 | C. 2 | 90 | A | 1.9 | A | 25.8 | A | 0.92 | A | 0.7 | A | 23.5 | D |
| C.E. 3 | C. 3 | 125 | D | 1.8 | A | 25.6 | A | 0.97 | A | 0.8 | A | 6.7 | A |
| C.E. 4 | C. 4 | 100 | A | 1.8 | A | 13.8 | D | 0.95 | A | 0.7 | A | 7.2 | A |
| C.E. 5 | C. 5 | 100 | A | 1.8 | A | 28.9 | A | 4.85 | D | 0.6 | A | 7.3 | A |
| C.E. 6 | C. 6 | 100 | A | 11.2 | D | 25.8 | A | 0.33 | A | 3.5 | C | 7.4 | A |
| C.E. 7 | C. 7 | 100 | A | 1.7 | A | 25.8 | A | 4.38 | D | 0.8 | A | 7.7 | A |
| C.E. 8 | C. 8 | 100 | A | 1.7 | A | 25.8 | A | 6.26 | D | 3.6 | C | 7.7 | A |
| C.E. 9 | C. 9 | 100 | A | 8.8 | C | 12.1 | D | 0.71 | A | 3.7 | C | 7.8 | A |

In the above table, "C.E." indicates "Comparative example", "C." indicates "Comparative", "DR" means "Percentage (%) of density reduction due to rubbing", and "DA" means "Degree of agglomeration when stored for 3 days at 50° C.".

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-100372, filed Jun. 22, 2022, which is hereby incorporated by reference herein in its entirety.

What is claimed is:

1. A toner comprising a toner particle, the toner particle comprising a binder resin, wherein T1, T2, T3, tan δ(T2), and tan δ(T2−10) satisfy expressions (1) to (4):

$$T3 - T1 \leq 10 \quad (1)$$

$$50 \leq T2 \leq 70 \quad (2)$$

$$0.30 \leq \tan\delta(T2) \leq 1.00 \quad (3)$$

$$1.00 \leq \tan\delta(T2)/\tan\delta(T2 - 10) \leq 1.90, \quad (4)$$

where, in measurement of viscoelasticity of the toner, T1(° C) represents a temperature at which a storage elastic modulus G' is $3.0\times10^7$ Pa, T2(° C) represents a temperature at which the storage elastic modulus G' is $1.0\times10^7$ Pa, T3(° C) represents a temperature at which the storage elastic modulus G' is $3.0\times10^6$ Pa, tan δ(T2) represents a ratio (tan δ) of a loss elastic modulus G" to the storage elastic modulus G' at the temperature T2(° C.), and tan δ(T2−10) represents the ratio (tanδ) at a temperature: T2−10(° C.)

wherein the binder resin comprises a crystalline resin A, a percentage of a content of the crystalline resin A in the toner is 20.0 to 70.0 mass % the crystalline resin A comprises a monomer unit (a) represented by formula (6);

(6)

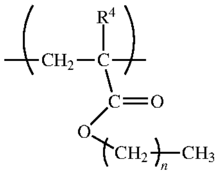

where, in formula (6), $R^4$ represents a hydrogen atom or a methyl group, and n represents an integer from 15 to 35, and a percentage of a content of the monomer unit (a) in the crystalline resin A is 60.0 to 100.0 mass %, and wherein the toner further comprises an amorphous resin B in addition to the crystalline resin A, the amorphous resin B comprises a monomer unit (b) represented by formula (7):

(7)

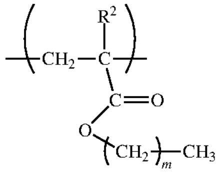

where, in formula (7), $R^2$ represents a hydrogen atom or a methyl group, and m represents 11, and a percentage of a content of the monomer unit (b) in the amorphous resin B is 15.0 to 40.0 mass %.

2. The toner according to claim 1, wherein the tan δ(T2) and the tan δ(T2−10) satisfy a following expression (5)

$$1.20 \leq \tan\delta(T2)/\tan\delta(T2-10) \leq 1.90. \quad (5)$$

3. The toner according to claim 1, wherein the crystalline resin A is a vinyl resin, and the amorphous resin B is a vinyl resin.

* * * * *